United States Patent
Greco

(10) Patent No.: US 10,169,107 B2
(45) Date of Patent: *Jan. 1, 2019

(54) ALMOST FAIR BUSY LOCK

(71) Applicant: International Business Machines Corporation, Armonk, NY (US)

(72) Inventor: Marco Greco, Staines (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,673

(22) Filed: Jun. 5, 2017

(65) Prior Publication Data

US 2017/0269973 A1 Sep. 21, 2017

Related U.S. Application Data

(63) Continuation of application No. 14/860,965, filed on Sep. 22, 2015, now Pat. No. 9,697,055.

(30) Foreign Application Priority Data

Nov. 18, 2014 (GB) .................................. 1420412.7

(51) Int. Cl.
*G06F 9/46* (2006.01)
*G06F 9/52* (2006.01)
*G06F 9/48* (2006.01)

(52) U.S. Cl.
CPC ................ *G06F 9/526* (2013.01); *G06F 9/48* (2013.01); *G06F 9/485* (2013.01); *G06F 9/4843* (2013.01);
(Continued)

(58) Field of Classification Search
CPC .......... G06F 9/48; G06F 9/4843; G06F 9/485; G06F 9/4881; G06F 9/52; G06F 9/524; G06F 9/526

See application file for complete search history.

(56) References Cited

U.S. PATENT DOCUMENTS 6,480,918 B1 11/2002 McKenney et al.
7,313,557 B1 12/2007 Noveck
(Continued)

FOREIGN PATENT DOCUMENTS

WO 2016079622 A1 5/2016

OTHER PUBLICATIONS

International Search Authority, Notification of Transmittal of the International Search Report and the Written Opinion of the International Searching Authority, or the Declaration, "Patent Cooperation Treaty," dated Feb. 18, 2016, 9 pages, International Application No. PCT/IB2015/058358.

(Continued)

*Primary Examiner* — Charles M Swift
(74) *Attorney, Agent, or Firm* — Jared C. Chaney

(57) ABSTRACT

The present invention provides a method, a system, and a computer program product of preventing thread monitoring preemptions in an almost fair busy lock. In an exemplary embodiment, the method, the system, and the computer program product include (1) publishing a current state of a lock and a claim non-atomically to the lock by a next owning thread, the claim comprising a structure capable of being read and written only in a single memory access, (2) obtaining a ticket, where the claim comprises an identifier of a ticket obtained by the next owning thread, and an indication that the next owning thread is claiming the lock; (3) comparing the ticket obtained by the next owning thread with a current ticket; (4) preventing thread monitoring preemptions; and (5) responsive to a match between the ticket obtained by the next owning thread and the current ticket, non-atomically acquiring the lock.

17 Claims, 18 Drawing Sheets

(52) U.S. Cl.
CPC .............. *G06F 9/4881* (2013.01); *G06F 9/52* (2013.01); *G06F 9/524* (2013.01)

(56) References Cited

U.S. PATENT DOCUMENTS

| | | |
|---|---|---|
| 7,334,102 B1 | 2/2008 | Conway |
| 7,487,279 B2 | 2/2009 | Su |
| 8,631,409 B2 | 1/2014 | Danko |
| 8,694,706 B2 | 4/2014 | Dice et al. |
| 9,158,597 B2 | 10/2015 | Ross |
| 2004/0194096 A1 | 9/2004 | Armstrong et al. |
| 2004/0216112 A1 | 10/2004 | Accapadi et al. |
| 2005/0022186 A1 | 1/2005 | Accapadi et al. |
| 2005/0080824 A1 | 4/2005 | Vaidyanathan et al. |
| 2006/0090168 A1 | 4/2006 | Ogasawara et al. |
| 2006/0206901 A1 | 9/2006 | Chan |
| 2007/0136725 A1 | 6/2007 | Accapadi et al. |
| 2007/0300226 A1 | 12/2007 | Bliss |
| 2008/0168458 A1 | 7/2008 | Fachan et al. |
| 2009/0235002 A1 | 9/2009 | Nir-Buchbinder et al. |
| 2009/0307707 A1 | 12/2009 | Gellerich et al. |
| 2009/0328053 A1 | 12/2009 | Dice |
| 2012/0198454 A1 | 8/2012 | Dawson |
| 2012/0240126 A1 | 9/2012 | Dice |
| 2012/0311606 A1 | 12/2012 | Marathe et al. |
| 2013/0152096 A1 | 6/2013 | Park et al. |
| 2013/0290967 A1 | 10/2013 | Calciu et al. |

OTHER PUBLICATIONS

Afshar et al., "Flexible Spin-Lock Model for Resource Sharing in Multiprocessor Real-Time Systems," 9th IEEE International Symposium on Industrial Embedded Systems (SIES), 2014, 11 Pages, IEEE.

Duvuru et al., "A Busy Lock and a Passive Lock for Embedded Load Management Priority," Application and Drawings, filed Mar. 25, 2015, p. 1-71, U.S. Appl. No. 14/668,137.

Eastep et al., "Smartlocks: Lock Acquisition Scheduling for Self-Aware Synchronization," ICAC'10 , Jun. 7-11, 2010, 10 Pages, ACM, Washington, DC, USA.

Greco, "An Almost Fair Busy Lock," Application and Drawings, Filed on Nov. 18, 2014, p. 1-55, GB Patent Application Serial No. GB1420412.7.

Ha et al., "Reactive Spin-locks: A Self-tuning Approach," Proceedings of the 8th International Symposium on Parallel Architectures, Algorithms and Networks (ISPAN'05), 2005, 6 Pages, IEEE Computer Society.

He et al., "Preemption Adaptivity in Time-Published Queue-Based Spin Locks," High Performance Computing (HiPC), 2005, p. 7-18, LNCS 3769, Springer-Verlag Berlin Heidelberg.

Johnson et al., "Decoupling Contention Management from Scheduling," ASPLOS'10, Mar. 13-17, 2010, p. 117-128, ACM, Pittsburgh, Pennsylvania, USA.

Johnson et al., "A New Look at the Roles of Spinning and Blocking," Proceedings of the Fifth International Workshop on Data Management on New Hardware (DaMoN 2009), Jun. 28, 2009, 6 Pages, ACM, Providence, Rhode Island.

Mellor-Crummey et al., "Algorithms for Scalable Synchronization on Shared Memory Multiprocessors" ACM Trans. on Computer Systems, Feb. 1991, p. 1-41.

Ouyang et al., "Preemptable Ticket Spinlocks: Improving Consolidated Performance in the Cloud," VEE'13, Mar. 16-17, 2013, p. 191-200, ACM, Houston, Texas, USA.

Pusukuri et al., "No More Backstabbing . . . A Faithful Scheduling Policy for Multithreaded Programs," International Conference on Parallel Architectures and Compilation Techniques, 2011, p. 12-21, IEEE Computer Society.

Raghavendra et al., "Paravirtualization for scalable Kernel-based Virtual Machine (KVM)," IEEE International Conference on Cloud Computing in Emerging Markets (CCEM), 2012, 5 Pages, IEEE.

UK Intellectual Property Office, "Search Report under Section 17," May 21, 2015, 5 Pages, International Application No. GB1420412.7.

Zhang et al., "Lock-visor: An Efficient Transitory Co-scheduling for MP Guest," 41st International Conference on Parallel Processing, 2012, p. 88-97, IEEE.

Greco et al., "An Almost Fair Busy Lock," U.S. Appl. No. 14/860,965, filed Sep. 22, 2015.

List of IBM Patents or Patent Applications Treated as Related, signed Jun. 2, 2017, 2 pages.

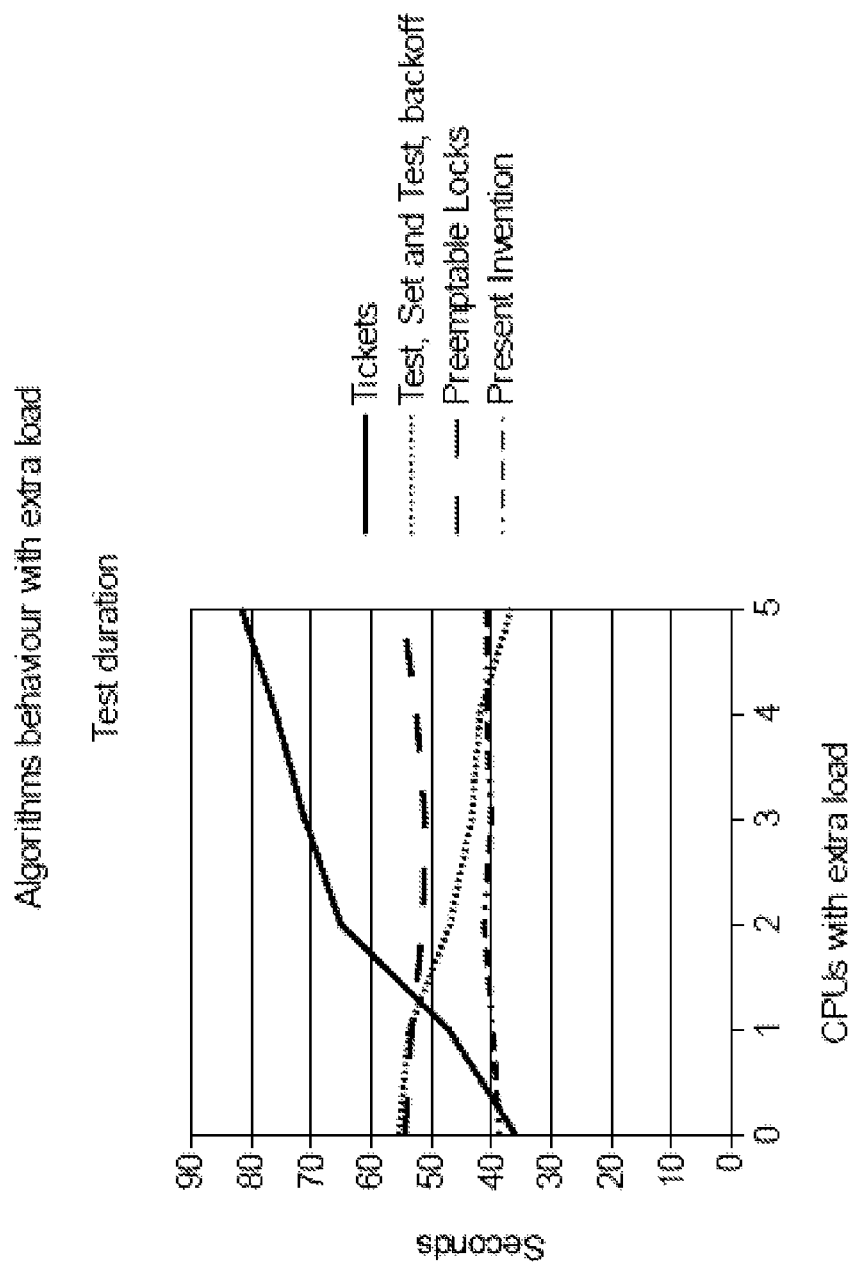

ALMOST FAIR BUSY LOCK

BACKGROUND

The present invention relates to managing exclusive control of a shareable resource between a plurality of concurrently executing threads, and more particularly, publishing a claim to a lock for a thread that is next to own the lock.

Concurrent algorithms (except those in the lock free class) utilize some sort of access control mechanism to ensure synchronization, that is, individual access to shared resources. Using mutual exclusion locks, for example, each thread, before accessing an individual shared resource, must acquire a lock in order to continue, or, if the lock is not available, the thread must wait until it has been released by the current owner of the lock.

In this context, thread waiting can be achieved in two possible ways. A busy lock may be used, in which the thread enters a tight loop inspecting the lock, continuing until the lock is found to be free. A passive lock may be used, in which the thread queues itself in a linked list of waiting threads and suspends execution, waiting to be woken up by the lock owner once the lock is available.

Prior art busy locks generally fall into two main classes of locking algorithms: unfair and fair. Generally, in unfair locking algorithms each lock requester loops fighting against all other lock requester until the lock requester detects that it has obtained the lock. Acquisition of the lock occurs more by chance than by design because acquisition of the lock is dependent on the relative timings of execution of instructions by all the competing lock requester threads. Conversely, in fair locking algorithms, access to the shareable resource protected by the lock is ordered and each lock requester waits for the previous lock requester in the order to have completed whatever critical section work the lock controls before the thread starts using the lock itself. The lock itself may maintain an ordered lists of threads requesting ownership of the lock.

Busy locks suffer from many side effects, which are common across both unfair and fair classes. Generally, fair and unfair locks are complementary in the way in which each is successful, or unsuccessful, in dealing with the side effects. The most striking difference is that in unfair lock algorithms, the lock owner is known to have acquired the lock, while in fair locks the lock owner is presumed to have done so.

SUMMARY

Embodiments of the present invention may be directed toward a method, a system, and a computer program product of preventing thread monitoring preemptions in an almost fair busy lock. In an exemplary embodiment, the method, the system, and the computer program product include (1) publishing a current state of a lock and a claim non-atomically to the lock by a next owning thread, in an ordered set of threads, that has requested to own the lock, the claim comprising a structure capable of being read and written only in a single memory access, (2) obtaining, by each thread in the ordered set of threads, a ticket, wherein the claim comprises an identifier of a ticket obtained by the next owning thread, and an indication that the next owning thread is claiming the lock; (3) comparing the ticket obtained by the next owning thread with a current ticket; (4) responsive to a match between the ticket obtained by the next owning thread and the current ticket, preventing thread monitoring preemptions; and (5) responsive to a match between the ticket obtained by the next owning thread and the current ticket, non-atomically acquiring the lock.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 13 shows the execution times for each of the "Tickets", "Test, Set and Test, Backoff" and "Preemptable Locks" algorithms together with an embodiment of an algorithm according to the present invention when run with as many lock requesters as there are CPU available (in this case, six threads, six CPUs), with a varying amount of external load, in the form of virtual machines taking 50% of physical CPUs time (from 0 to 5).

DETAILED DESCRIPTION

Figure 1:
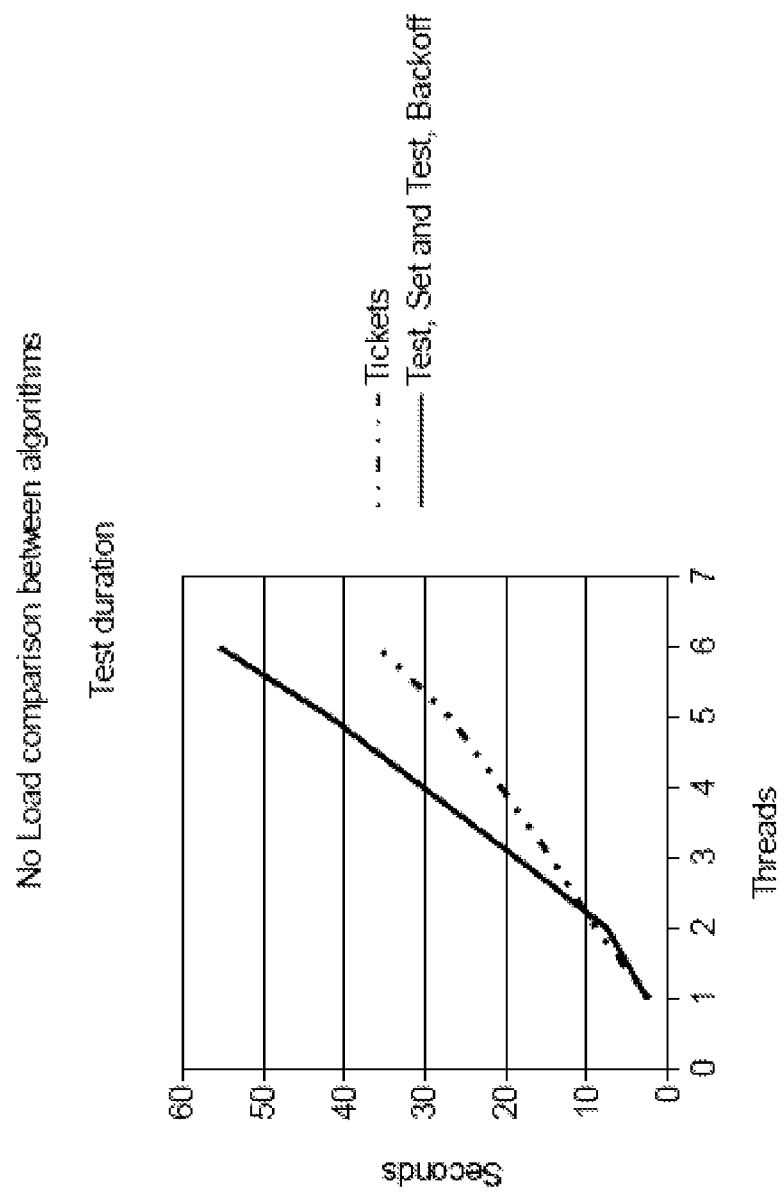
FIG. 1 shows graphs of test case run time versus the number of threads in a first test case scenario in which each thread has to acquire a busy lock thirty million times, for each of a "Tickets" and a "Test, Set and Test, Backoff" algorithm.

As stated above, busy locks can suffer from side effects. These may include the following, as described herein below: (i) "Thundering herd", (ii) "CPU cache invalidation", (iii) "In core thread starvation"; (iv) "Starvation"; and (v) "Convoys".

"Thundering herd"—typical test and set locks will try to acquire the lock using a specific assembly language instruction which writes a specific value into the lock structure and reads back, with the bus locked, the value that was previously stored. If the value read back from the lock differs from the value previously stored, then the lock has been acquired, otherwise a new attempt at acquiring the lock is required. This process works when only a couple of threads are trying to acquire the lock. However when many threads, a "thundering herd" of threads, are trying to acquire the lock, the lock turns busy which results in a substantial drain on the CPU and, more importantly bus resources, as well as CPU cache invalidation, described below.

"CPU cache invalidation"—Write heavy algorithms such as test and set, by virtue of rewriting to the same memory location over and over again, will force other CPUs to reload their internal memory cache at every loop. If only one thread is looping on the lock, this is not a problem, but when two or more threads are running on different CPUs looping on the same lock, each will invalidate the other's memory cache entry for the lock, forcing them to access the lock from memory rather than from cache, at a much higher cost, greatly affecting the lock performance.

"In core thread starvation"—The above problems can be made worse when coarse grained in-core threads (where CPUs execute multiple logical threads of executions, which the operating system would see as two different CPUs, but only switching in between threads when the executing thread needs to halt, for instance for memory access), may degrade lock performance even further if the lock owner, trying to relinquish the lock, is associated to one thread in the CPU, while the other one loops to acquire the lock. Until the waiter thread yields to the owner thread (and being coarse grained, it might not do so for a while), the lock effectively stalls because the lock owner doesn't get a chance to run.

"Starvation"—When more threads try to access the same lock than there are CPUs available, all the CPUs will end up being busy running tight loops trying to acquire the same lock. This will prevent other threads, whether they are trying to access the lock, or even worse, doing unrelated work, from acquiring CPU resource. Since all CPUs, bar the one associated with the lock owner, will be looping on the lock but not doing any useful work, the whole system will effectively be starved to a grinding halt.

"Convoys"—This side effect is typical of ordered access fair lock algorithms—such as tickets or lists, for example, MCS (named after it's originators, Mellor-Crummey and Scott) or derivatives, such as K42. In these algorithms, each thread has to wait for the previous lock requester to acquire and relinquish the lock before it is allowed to acquire the lock itself. The net result is that if the lock owner for some reason is delayed in releasing the lock, this delay will propagate to the next waiter. This in turn may cause the next thread to be delayed, which will cause the next thread to be delayed, the chain of delays only being broken when there are no more waiters. In these circumstances the throughput on the lock will be severely affected with each thread appearing to move in step mimicking the behavior of the preceding one. The lock owner may be delayed in releasing the lock if there is a programming error, that is the lock is acquired for a long time, or if there is an operating system issue, that is the lock owning thread is preempted by the operating system and no access is possible until the operating system returns that thread to a running state.

Unfair algorithms suffer mostly from thundering herds and CPU cache invalidation. This is due to each thread continuously scribbling the lock in an attempt to obtain it. "Scribbling" is when the lock has been overwritten with thread information that is no longer current and therefore incorrect. The more threads that are trying to access the lock, the more cache invalidations there are. The more the scribbling activity becomes expensive, the more thundering herds become a problem. Conversely, fair algorithms suffer from convoys: each thread has to wait for the previous thread to have completed its work, and if for whatever reason the previous thread is delayed, such delay will propagate to all waiters until there is a gap between a lock requester and the next, that is when the next lock requester attempts to obtain the lock when it is free.

The most common trigger of convoys is the operating system preempting a thread while it is spinning, because its time slice has elapsed. This is called the "Lock Requester Preemption" problem. Lock requesters ahead of a thread that has been preempted will acquire and release the lock, but the preempted thread will not be there to check that its turn has arrived, so every thread subsequent to the preempted thread has to wait for the operating system to schedule the preempted thread again. In doing so, each subsequent waiting thread will likely exhaust its time slice and will be preempted by the operating system, forming a convoy of threads going through the lock at a fraction of the throughput that the lock can provide. With modern multi-core CPUs and virtual machine (VM) environments, these bottlenecks are seen more frequently. The virtual machines scheduler can schedule the virtual CPU running the lock holder off the physical CPU. The application running in the VM environment has no control over the VM scheduler and gets stuck waiting for that virtual CPU to be scheduled again. Virtual CPU preemption is so much of a problem in virtual hosted environments that, as an example, the Linux® operating system uses ticket locks (fair) in non-hosted environments, because of their superior performance, but still retains Set and Test locks (unfair) in hypervisor environments, because once a virtual CPU is preempted and a convoys ensues, the guest operating system literally grinds to a halt. Work in trying to adapt fair locks to be usable in hypervisor editions of the Linux kernel has been going on since at least 2010.

The following test case demonstrates the problem. Consider a multi-threaded application in which each thread has to periodically go through a critical section, for a set number of times:

```
static void *
load(void *args)
{
    int seed = time(NULL);
    int c, t;
    for (c = 0; c < target; c++)
    {
        <lock mutex>;
        for (t = delay_l; t; t--)
            <assembler noop>;
        counter++;
```

```
        <unlock mutex>;
            for (t = delay_u; t; t--)
                <assembler noop>;
                if ((rand_r(&seed) % yield_rate) == 0)
                    <yield>;
                }
        }
```

The two delays ("delay_l" and "delay_h"), "target" and "yield rate" in the test case above are presets in the main program and "counter" is the global resource controlled by the busy lock. The test completes when all threads have completed their work, that is each thread has acquired the busy lock for the required number of times.

Referring to FIG. 1, which illustrates the test case run times versus the number of threads of the "Tickets", that is a "fair", algorithm, and the "Test, Set and Test, Backoff", that is an "unfair", algorithm, on a six CPU x86 machine, with no other load, when each thread has to acquire the busy lock thirty million times. When only one thread goes through the critical section, the two algorithms have a similar execution time, which is down to comparable cost: one locked bus, cache invalidating write (at a cost of about 100 clock cycles) to obtain the lock, one cache invalidating write (about 6 clock cycles) to release it.

Even at two threads the algorithms are comparable. In practice, the "Test, Set and Test, Backoff" algorithm may even be marginally better. With each of the algorithms, the cost of the algorithm is the same for two threads as for one thread, plus N non invalidated cache reads, one per loop of busy waiting. However, when the number of threads increases above two threads, the situation rapidly changes. The cost of the "Tickets" algorithm is the same as for the two threads case, while for "Test, Set and Test, Backoff" algorithm, each lock release is followed by N bus locked, cache invalidating writes (at the cost of 100 clock cycles each), one for each thread attempting to acquire the lock after the busy wait. The higher the number of threads involved, the higher the cost of "Test, Set and Test, Backoff" algorithm. Clearly the behavior of the "Tickets" algorithm is much more desirable.

Figure 2:
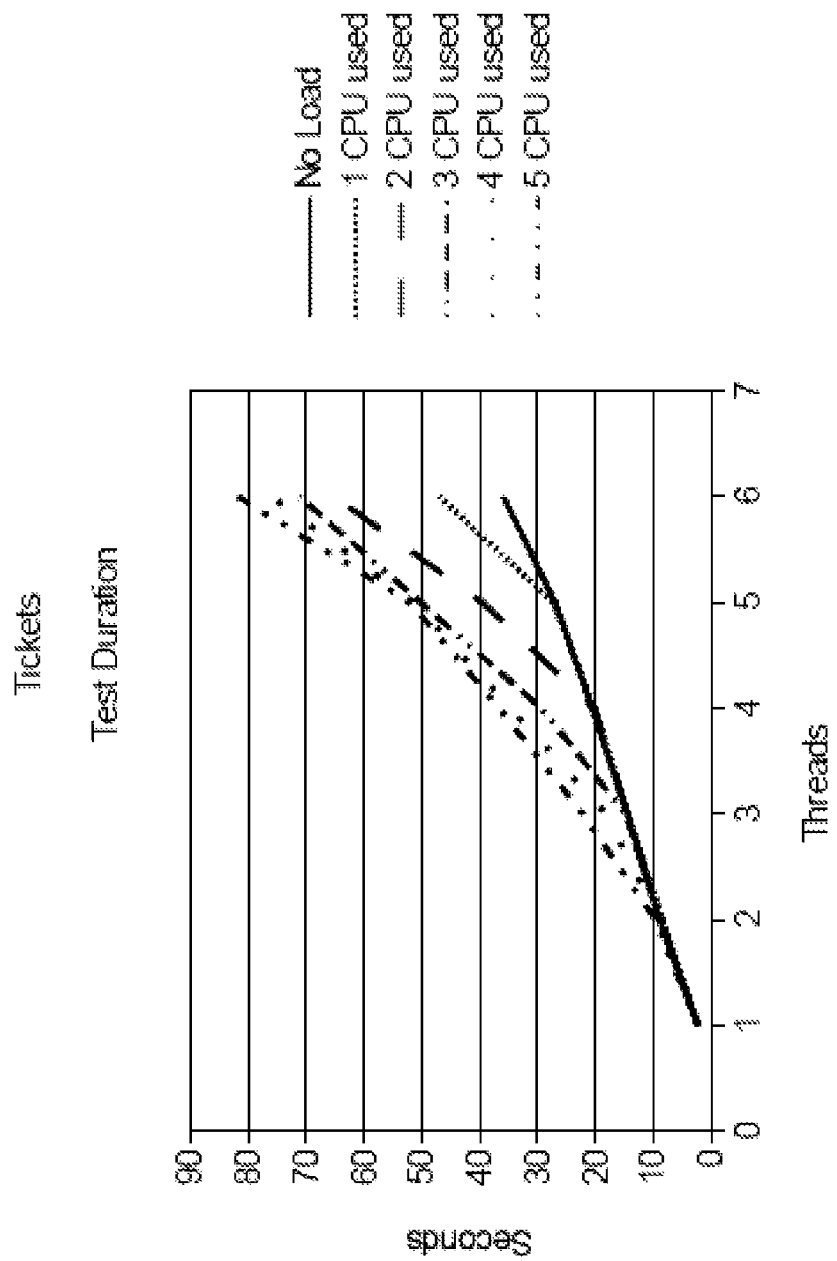
FIG. 2 shows graphs of test case run time versus the number of threads in a second test case scenario for the "Tickets" algorithm, as load, in the form of single CPU virtual machines with 50% CPU load, is added.
Figure 3:
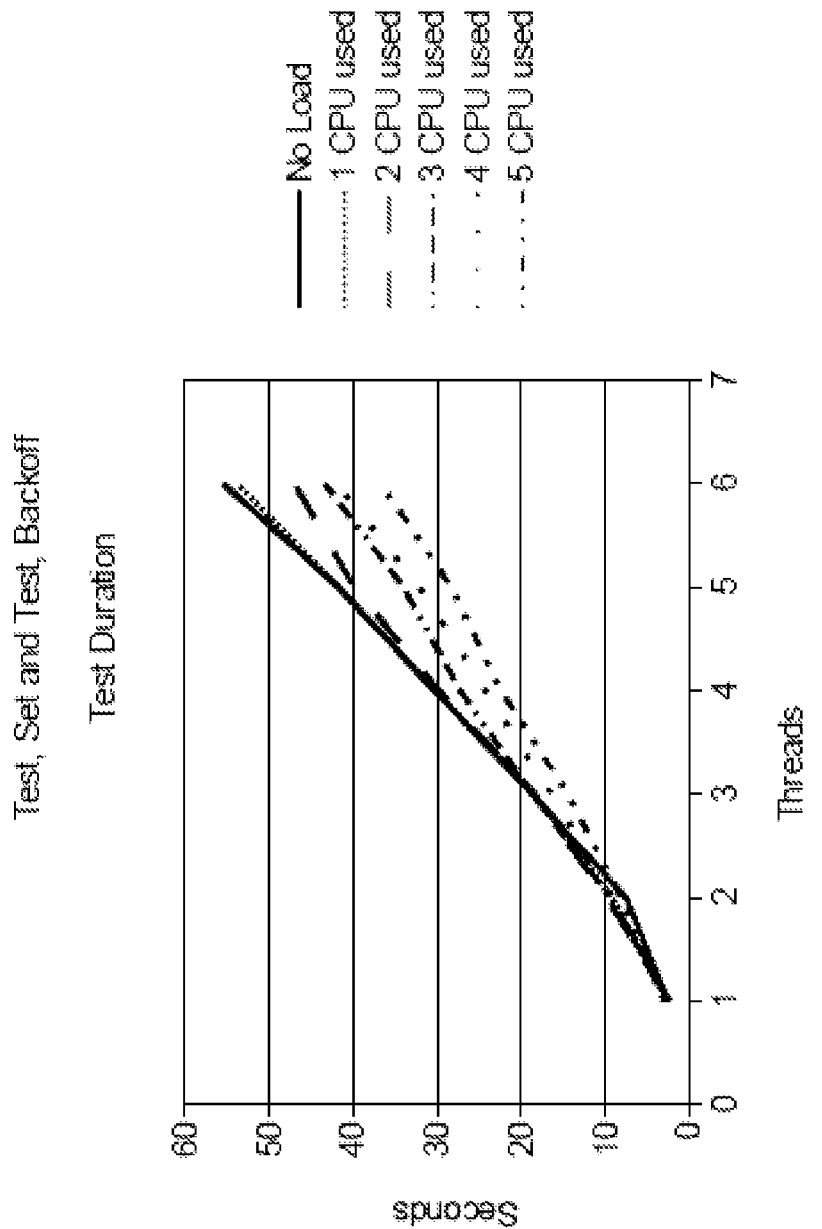
FIG. 3 shows graphs of test case run time versus the number of threads in a second test case scenario for the "Test, Set and Test, Backoff" algorithm, as load, in the form of single CPU virtual machines with 50% CPU load, is added.

Referring to FIGS. 2 and 3, which show the behavior of the "Tickets" algorithm versus the "Test, Set and Test, Backoff" algorithm as load, in the form of single CPU virtual machines with 50% CPU load, is added to the six CPU system, thus reducing the amount of CPU time available to the threads.

FIG. 2 shows a graph of test case run time versus the number of threads in a second test case scenario for the "Tickets" algorithm, as load, in the form of single CPU virtual machines with 50% CPU load, is added. With the "Tickets" algorithm, as long as the number of working threads matches that of the available CPUs, the execution times remain comparable to the "no load" case. As soon as the number of running threads exceeds the number of available CPUs, that is, some threads have to contend for CPU resources with virtual machines, the test run time is seriously degraded. By way of the example, the solid line, labeled "No Load", shows the behavior of the "Tickets" algorithm when no virtual machine is running. The test case duration increases linearly as the number of threads increase up to the number of available CPUs.

The ultrafine dashed line, labeled "1 CPU used", shows the behavior with one CPU busy with one virtual machine. The test case duration increases linearly while the number of running threads is less than (number of CPUs—1), and seriously degrades as the running threads have to use the CPU which is busy running the virtual machine. As the number of CPUs busy with virtual machines increases, so does the test case runtime. By the time all CPUs bar one are busy, the test case duration has more than doubled. This is due to threads next in line to acquire the lock being preempted by the operating system, in order to allow the virtual CPUs to run, which in turn forms a convoy. The higher the number of CPUs otherwise occupied in running the virtual CPUs, the higher the number of preemptions, the worse the execution times.

It is worth nothing that, for the example of FIG. 2, the graph is reproducible only if each virtual machine load is limited to 50% of each CPU time. When this is exceeded, the run times become wildly unpredictable, typically, with no run better than the graph of FIG. 2, but many runs in which the run time is five, six or seven times worse than in the 50% load case.

FIG. 3 shows a graph of test case run time versus the number of threads in the second test case scenario for the "Test, Set and Test, Backoff" algorithm, as load, in the form of single CPU virtual machines with 50% CPU load, is added. In contrast with the "Tickets" example of FIG. 2, in the "Test, Set and Test, Backoff" example, as the number of CPUs otherwise occupied increases, the execution times do not get worse. In practice, execution times improve substantially with load. The reason for this is that certain threads will be preempted to allow virtual machines to run, limiting the number of threads looping on the lock, and containing the effects of a thundering herd, which instead materializes under no virtual machine load. This is due, as mentioned above, to all waiting threads performing a locked bus, cache invalidating write at the same time once the lock is released. Under load, the behavior of the "Test, Set and Test, Backoff" algorithm is much more desirable.

Figure 4:
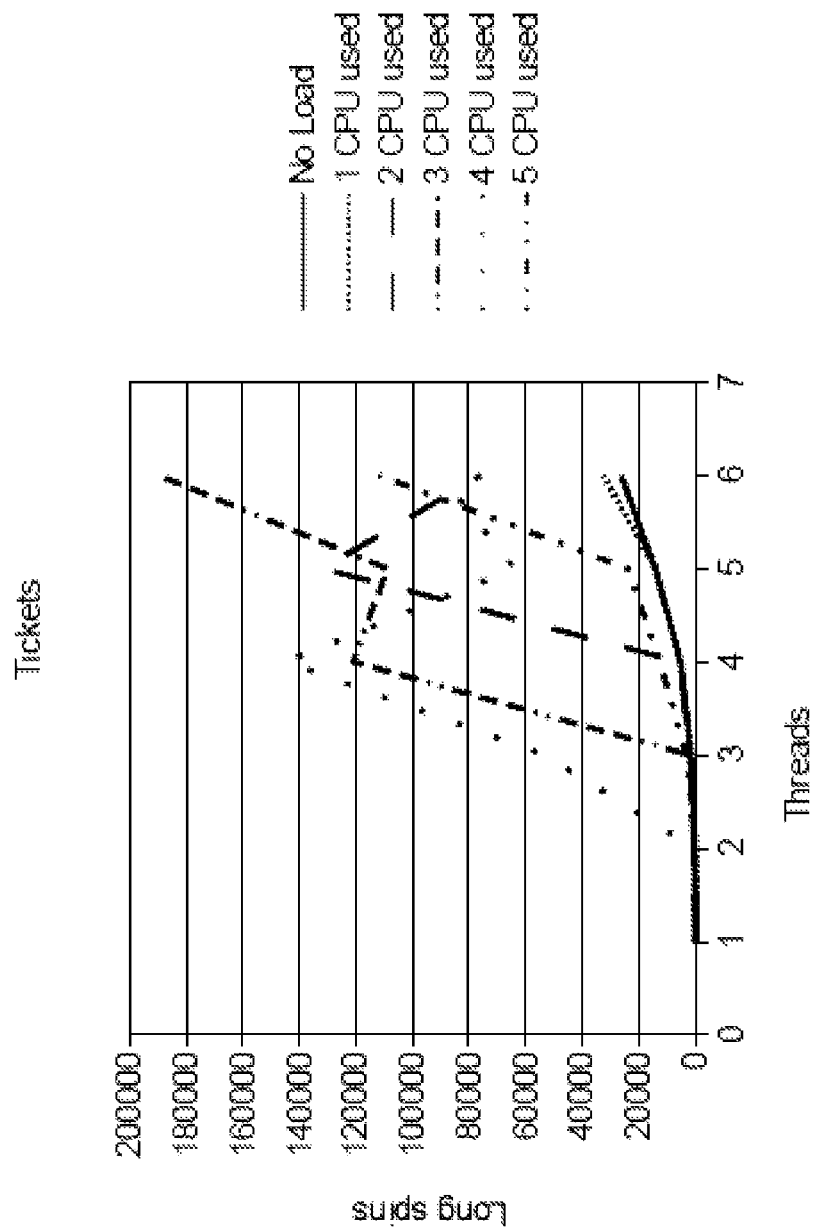
FIG. 4 shows graphs of the number of long spins versus the number of threads in the second test case scenario for a number of different CPUs for the "Tickets" algorithm.
Figure 5:
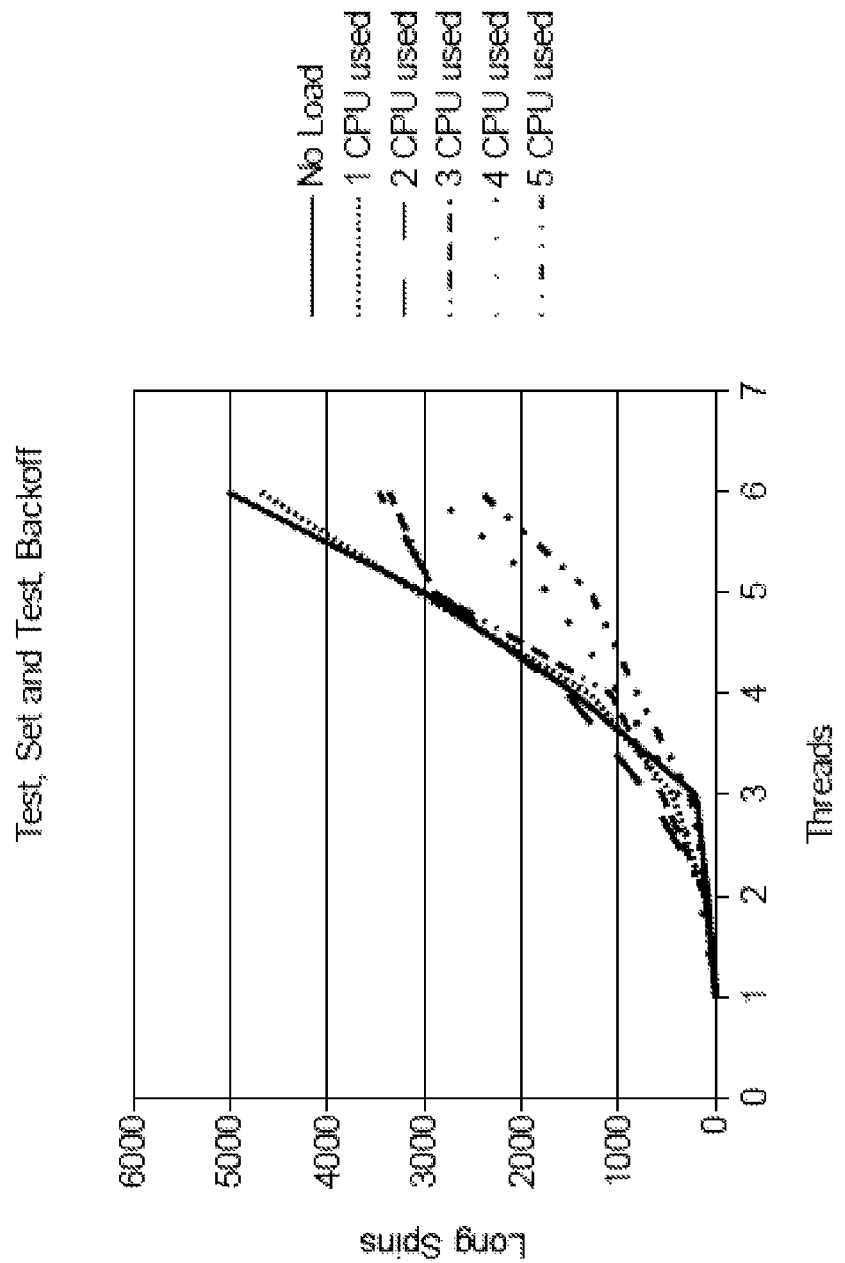
FIG. 5 shows graphs of the number of long spins versus the number of threads in the second test case scenario for a number of different CPUs for the "Test, Set and Test, Backoff" algorithm.

The number of preemptions as the load increases can be measured by counting all lock requests that last substantially more than the average number of loops. In the examples above, the average loops per lock was measured at around one hundred. A "long spin" may be defined as any lock attempt lasting more than three hundred times the average lock spin. This happens because the previous lock requester has been preempted. FIGS. 4 and 5 show graphs of the number of long spins versus the number of threads for a number of different CPUs for each of the "Tickets" algorithm and the "Test, Set and Test, Backoff" algorithm.

FIG. 4 shows a graph of the number of long spins versus the number of threads in the second test case scenario for a number of different CPUs for the "Tickets" algorithm. When there is No Load, shown by the continuous line in the lower part of the graph, the number of long spins increases at a slow rate as the number of threads increases. When there is one CPU used, shown by the ultrafine dashed line in the lower part of the graph, the number of long spins increases at the same rate as the No Load line until there are five threads, when it increases at a slightly faster rate. When there are two CPUs used, shown by the fine dashed line, the number of long spins increases at the same rate as the No Load line until there are four threads, then it increases sharply when there are five threads, then decreases when there are six threads. When there are three CPUs used, shown by the ultrafine 2 dots, 3 dashes line, the number of long spins increases at the same rate as the No Load line until there are three threads, then it increases sharply when there are four threads, then decreases slightly when there are five threads, before again increasing sharply when there are six threads. When there are four CPUs used, shown by the fine dotted line, the number of long spins increases at the same rate as the No Load line until there are two threads, then it increases sharply as there are three and then four threads, then decreases sharply when there are five threads, before again increasing when there are six threads. When there are five CPUs used, shown by the 2 dots, 1 dash line, the number of long spins increases at the same rate as the No Load line until there are three threads, then it increases slowly as there are four and then five threads, then increases sharply when there are six threads.

FIG. 5 shows a graph of the number of long spins versus the number of threads in the second test case scenario for a number of different CPUs for the "Test, Set and Test, Backoff" algorithm. Each of the No Load and one CPU used to five CPUs used lines show a low level of long spins whilst the number of threads is limited to two. When three to six threads are present, the number of long spins increases, but to a much lower level than that of FIG. 4.

In FIG. 4, the "Tickets" algorithm, the best scenario, that is, no extra load from CPUs running virtual machines, shows a behavior that is substantially worse than the worst in FIG. 5, the "Test, Set and Test, Backoff" algorithm. In FIG. 4, the "Tickets" algorithm, as the extra load from CPUs running virtual machines increases, the number of preemptions is both unpredictable and out of control. In FIG. 5, the "Test, Set and Test, Backoff" algorithm, the preemption behavior seems to follow the test case duration time behavior, that is, the higher the load, the better the behavior. Note that in FIG. 5, the "Test, Set and Test, Backoff" algorithm still shows some long spins, because there will be some lock owners preempted after the lock has been acquired.

Since fair locks, such as those using the "Tickets" algorithm, offer a clear performance advantage over unfair implementations, such as those using the "Test, Set and Test, Backoff" algorithm, several attempts have been made to improve the resilience of fair locks to convoys and the lock owner preemption problem.

Examples of such attempts at improving the resilience of fair locks include time published (or cancelable) locks, virtualization and hardware based techniques and adaptive lock algorithms.

A time published (or cancelable) lock is a variation of a list lock, a representative of list locks being MCS. In list lock algorithms, each thread is busy looping monitoring the state of the previous locker. This approach has several advantages in terms of CPU cache invalidation. As each thread is monitoring a different memory location, any lock release will only invalidate, once, the cache of the next lock owner, however it is costly to implement and is more prone to convoys than other fair lock algorithms.

By altering the behavior of each locker to provide a heartbeat, in the form of a changing timestamp, preempted threads can be detected because the timestamp does not change. The preempted thread can be removed from the list by the lock owner, at the time of lock release (in the case of MCS—TP), or while monitoring the state of the previous lock requester (in the case of the CLH—TP algorithm described herein below), thus avoiding convoys. The disadvantages of such an approach are that maintaining the lock requester list is expensive in the first place, and searching for a non-stalled thread at unlock time or removing stalled threads in flight makes it even more expensive. Both MCS-TP and CLH-TP are about 75% more expensive in execution time than "Test, Set and Test, Backoff" in the non-contended case.

Using virtualization and hardware based techniques, Virtual Machines can be made, either via hardware support, or by a hint from the guest operating system, to schedule all virtual CPUs for a guest virtual machine when spin lock activity is detected either via the hardware or reported via the guest OS. Since all virtual CPUs for the virtual machine involved in the lock are running, the lock owner is not stalled and a convoy is averted. This approach requires special coding on both the guest OS and the virtualization layer and is again a costly one—all virtual CPUs for the guest machine involved in the locking activity are made to run, potentially not doing any useful work, and at the expense of virtual CPUs for other virtual machines, which means that processes running on other virtual machines might see a temporary but substantial dip in performance.

In an adaptive lock algorithm, such as described above with respect to "Preemptible Ticket Spinlocks", a fair and an unfair lock are combined to provide the best traits of each in a single lock algorithm.

The algorithm is implemented in such a way that each lock requester will go through a first fair "Ticket" lock for a specified number of loops, calculated as the average spin loop count to acquire the lock, and when that has elapsed, it will move onto an second unfair "Test, Set and Test, Backoff" lock. Since all subsequent lock requesters have to go through the first fair "Ticket" lock first, under normal operation, it is pretty much guaranteed that the lock requester that is first in line will get to the second unfair "Test, Set and Test, Backoff" lock without having to contend with other threads, and no thundering herd can occur. Contention on the second unfair "Test, Set and Test, Backoff" lock occurs when one of the lock requester threads has been preempted and arrives at the unfair lock at the same time as the rightful next thread in line has just exited the first fair "Tickets" lock.

The disadvantage of this approach is that, under no load, each locking attempt requires:

(i) a locked bus, cache invalidating write to get a new ticket (100 cycles on x86);

(ii) a locked bus, cache invalidating write to acquire the unfair lock (another 100 cycles);

(iii) a cache invalidating write to increase the display; and (iv) a cache invalidating write to release the unfair lock.

This means that it is twice as costly as using the "Tickets" algorithm. In addition to this extra cost, the reality is that the calculation of the timeout is empirical, and there will be circumstances where more than one thread will get to the unfair lock at the same time, triggering temporary thundering herds.

A problem with prior art implementations is the operating system preempting a thread while it is spinning, because its time slice has elapsed. This is called the "Lock Requester Preemption" (LRP) problem. Lock requesters ahead of a thread that has been preempted will acquire and release the lock, but the preempted thread will not be there to check that its turn has arrived, so every thread subsequent to the preempted thread has to wait for the operating system to schedule the preempted thread again. In doing so, each subsequent waiting thread will likely exhaust its time slice and will be preempted by the operating system, forming a convoy of threads going through the lock at a fraction of the throughput that the lock can provide. With modern multi-core CPUs and virtual machine (VM) environments, these bottlenecks are seen more frequently.

Figure 6:
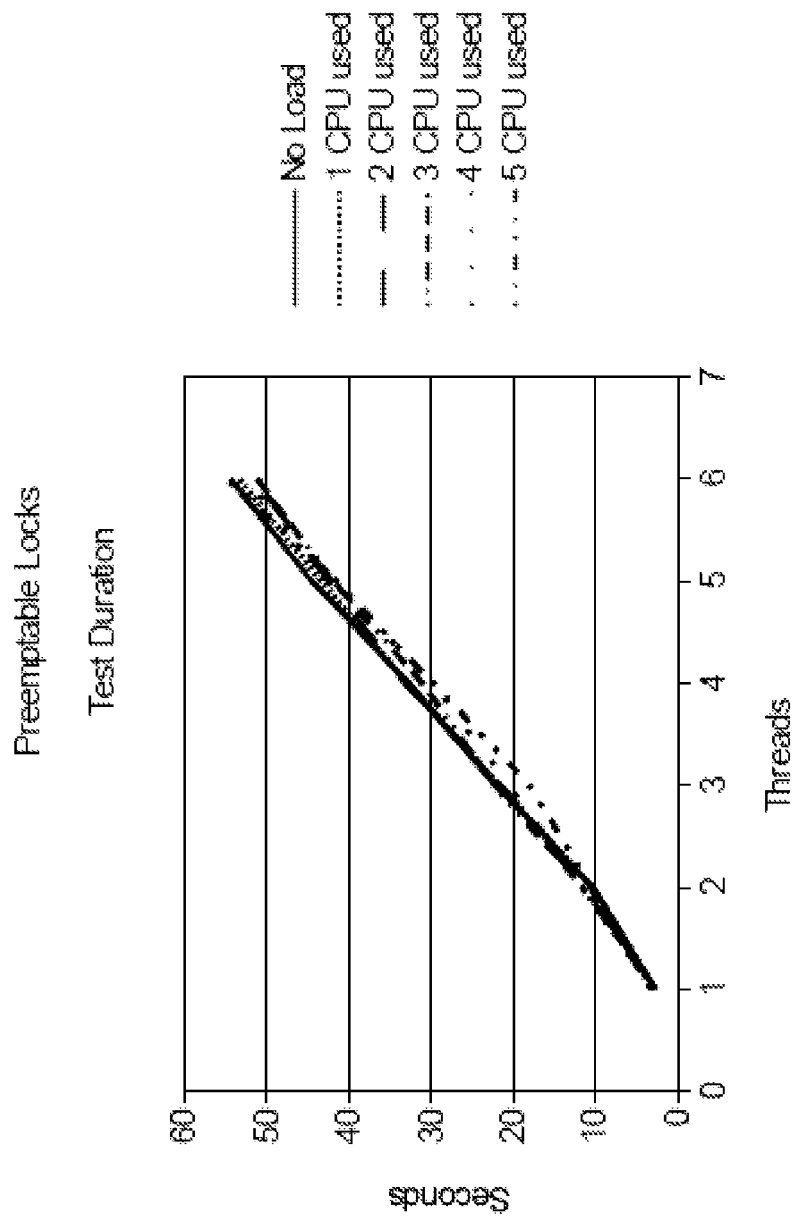
FIG. 6 shows graphs of the test case run time versus the number of threads in the second test case scenario for the "Preemptible locks" algorithm, as load, in the form of single CPU virtual machines with 50% CPU load, is added.

FIG. 6 shows the behavior of preemptable locks in the second test case scenario. Clearly, the use of preemptable locks does not offer any better performance than "Test, Set and Test, Backoff" when no extra load is applied, and does not achieve any performance improvement when under load, which means that it is not a viable substitute for either "Tickets" or "Test, Set and Test, Backoff". An advantage is that its behavior is predictable with load, and as shown in FIG. 6, it is almost invariant with load.

Figure 7:
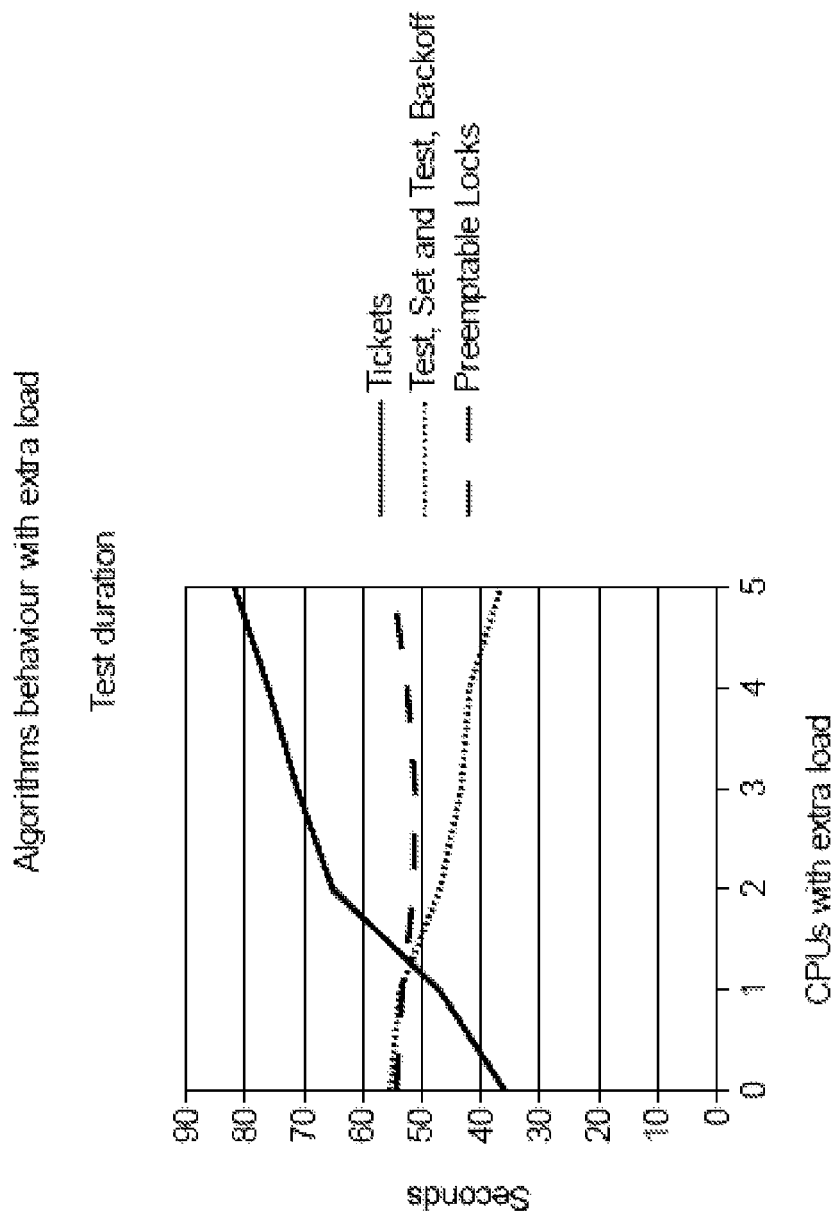
FIG. 7 shows the execution times for each of the "Tickets", "Test, Set and Test, Backoff" and "Preemptible Locks" algorithms when run with as many lock requesters as there are CPUs available (in this case, six threads, six CPUs), with varying amounts of external load, in the form of virtual machines taking 50% of physical CPUs time (from 0 to 5)

FIG. 7 shows the execution times for each algorithm when run with as many lock requesters as there are CPUs available (in this case, six threads, six CPUs), with a varying amount of external load, in the form of virtual machines taking 50% of physical CPUs time (from 0 to 5).

The problem with the "Preemptible lock" algorithm is that it forces every lock requester to have further fixed and substantial cost over the "Tickets" algorithm which then negates the advantages of avoiding LRP. In the x86 architecture, both the LOCK XADD instruction, used to atomically obtain the next ticket, and the LOCK XCHG instruction, used to try to grab the unfair lock, are extremely expensive, typically in the order of in excess of one hundred clock cycles, versus less than ten for a non locked store. This is because they require, in order to satisfy the memory model in use (in which, among other things, writes are not reordered with other writes, loads are not reordered with writes to the same location), to perform the following steps:

(i) a complete flushing of the write pipeline to memory, that is, having to wait for all the writes queued for execution to be committed to memory;
(ii) bus locking;
(iii) a memory read, which will probably imply a cache miss, as a different lock requester had previously modified the memory contents;
(iv) a memory write;
(v) flushing of the write pipeline to memory; and
(vi) bus unlocking.

All this, while other in thread cores (in the current or other cores) are prevented from doing any memory access, and, thus, are possibly completely blocked. Other CPU implementations (ARM®, Itanium®, PA RISC®, POWER®, SPARC®) have slightly different requirements, but are just as costly.

Embodiments of the present invention provide a direct replacement for fair, non list, busy locks (such as "Tickets", as used by the Linux Operating System) which is free from Lock Requester Preemption (LRP) problems and offers comparable performance to the fair locks, when they are not affected by LRP.

In the "Preemptable lock" algorithm described above with respect to FIGS. 6 and 7, making all of the lock requests or the unlock operations go through each of the two locks forming a Preemptable lock every time in order to be able to detect LRP instances negates the benefit of the LRP detection.

Embodiments of the present invention minimize the cost of the algorithm at each lock request and move the bulk of the burden of LRP detection onto later threads, which are still looping doing no real work whilst waiting to acquire the lock.

Figure 8:
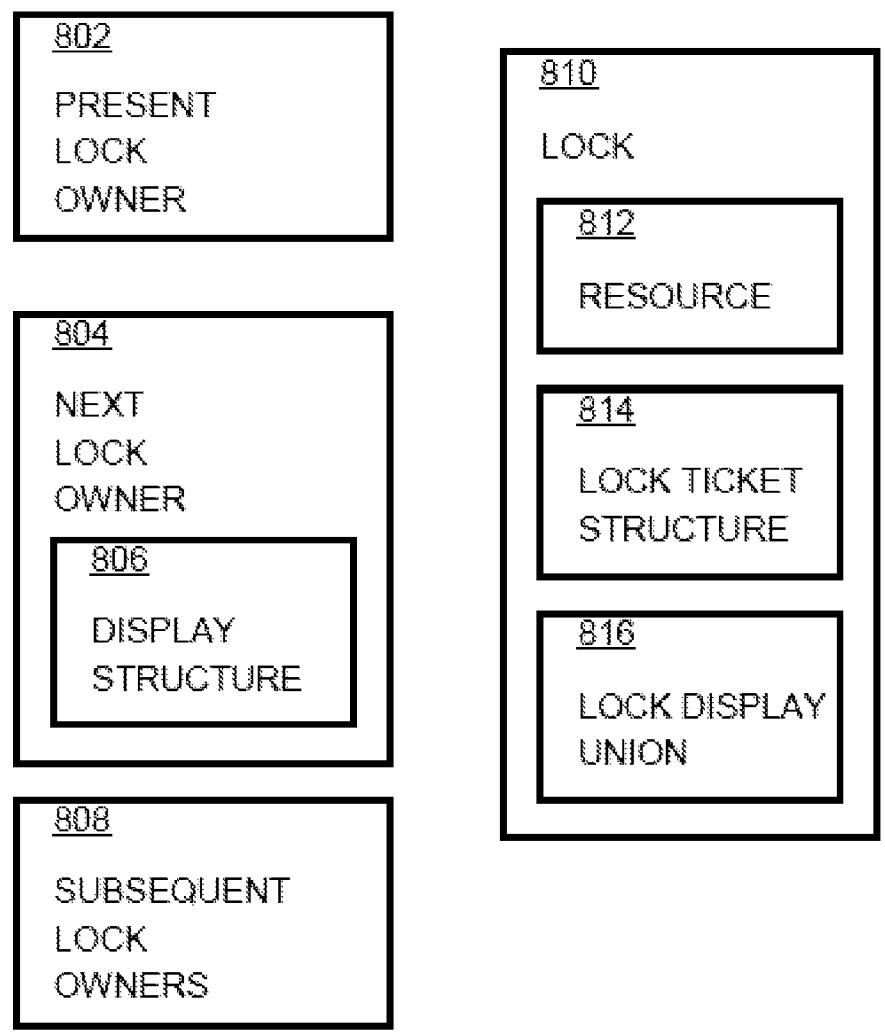
FIG. 8 shows a block diagram of an embodiment of the present invention having a plurality of threads desiring to access a lock controlling a shared resource.

FIG. 8 shows a block diagram of an embodiment of the present invention having a plurality of threads 802, 804, 808 desiring to access a lock 810 controlling a shared resource 812. Lock 810 comprises a lock.ticket structure 814, which is a conventional ticket structure used in conventional locks and well known to persons skilled in the art. Present lock owner 802 is the thread that currently "owns" the lock 810 and has exclusive access through the lock 810 to the shared resource 812. Next lock owner 804 is the next thread in the ordered set of threads that desires to access the shared resource 812 through the lock 810. Subsequent lock owners 808 are further threads that also desire to access the shared resource 812 through the lock 810, but are further down the ordered set of threads. In non-list locks such as Test and Set, Ticket and embodiments of the present invention, the lock requesters may have the knowledge of there being other threads ahead or behind them, but the lock requesters do not have visibility of which these threads are. In list locks there is a direct link between one thread and the next.

In embodiments of the invention, the lock 810 further comprises a lock.display structure 816. This stores state information enabling claimers 804 of the lock 810 to sign the lock 810 with their ticket and to mark the lock 810 as in use, thus publishing their claim to the lock 810. A claimer 804 of the lock 810 signs the lock with its ticket when it is the next thread 804 in line to use the lock 810. It also marks the lock 810 as being in use by setting the high bit in lock.display.detail.taken 918. Before manipulating the lock.display structure 816 in the lock 810, a next lock owner 804 makes a copy of the lock.display structure 816 and stores it in storage owned by the next lock owner 804 as display structure 806.

Figure 9:
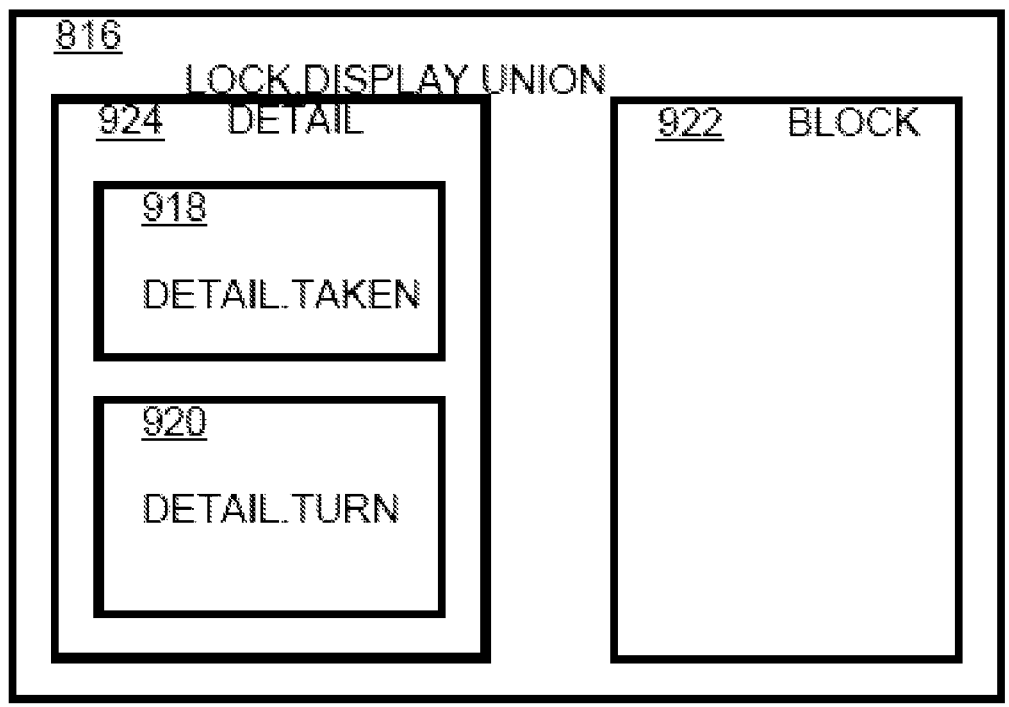
FIG. 9 shows the lock.display structure of FIG. 8 in more detail.

FIG. 9 shows the lock.display union 816 of FIG. 8 in more detail. Lock.display union 816 comprises lock.display.detail 924, which in turn comprises detail.taken 918 and detail.turn 920. Detail.turn 920 is the ticket number of the thread (next lock owner 804) which currently claims, but does not own, the lock 810. Detail.taken 918 is an indicator used by the next lock owner 804 to indicate that it is claiming the lock. Other threads reading the lock.display union 816 can determine from detail.taken 918 that the lock is claimed by another thread and from detail.turn 920 the ticket number of the thread that is claiming the lock.

The lock.display union 816 is implemented as a union. The use of a union to implement lock.display 816 is important to locks 810 implemented according to the present invention because the entire lock.display union 816 is read or written in a single instruction. A union is a storage space shared by multiple elements and differs from a structure, which is a storage area with allocated space for each of the individual entries. Unions have the same formats and operators as structures. Unlike structures, which reserve separate chunks of memory for each data member, unions allocate only enough memory to accommodate the largest data member. In unions data members overlay or share memory, and unions may access members as different types. In FIG. 9, display.detail 924 and display.block 922 share the same memory space 816. In turn, display.detail 924 is a structure comprising detail.taken 918 and display.turn 920. In embodiments of the present invention, display.block 922 is read and display.taken 918 and display.turn 920 are populated within the same instruction. Conversely, by writing display.block 922, display.taken 918 and display.turn 920 are written within a single instruction. Display.block 922 merely serves as a conduit for display.taken 918 and display.turn 920.

As mentioned above, the entire lock.display union 816 is read or written in a single instruction. The reason for this limitation is that display.taken 918 and display.turn 920 must be manipulated in a consistent manner. If two separate instructions were used to read or write the lock.display union 816, there is no guarantee that another locker, running on another CPU, will not manipulate display.taken 918 after the current locker has read or manipulated it, but before it has had a chance to read or manipulate display.turn 920 as well.

Embodiments of the invention achieve the minimization of the cost of the algorithm at each lock 810 request and move the burden of LRP detection onto later threads 804, 808, which are still looping waiting to acquire the lock by making the next lock owner 804:

(i) flag that it has claimed the lock 810 by using substantially cheaper non-atomic operations;

(ii) check that it hasn't been preempted; and (iii) retry acquiring the ticket lock 814 if it has.

This puts the majority of the cost of the lock 810 algorithm, that is, preempted thread detection and non-fair lock acquisition, inside the loop used by threads 804, 808 still waiting to acquire the ticket lock 814. This means that:

(i) the later threads 804, 808 are busy looping, and thus do nothing useful, so they can check for and prevent convoys without affecting overall performance; and (ii) referring to the specific example of FIG. 4, the previous "long spin" graphs for the ticket algorithm; in the worst case, there are 180,000 long spins (that is, lock requester preemptions) over 90 million lock requests. If the entirety of the algorithm cost was to be shifted to just the preemptions, the costly activity described before would only be done 180,000/180 million that is 0.1% of all the lock requests, therefore saving almost the entirety of the extra cost. Variations of the specific example of FIG. 4 will produce different numbers, but the same principles apply.

Although this may sound similar to the techniques used in the CLH-TP algorithm, that is, threads removing prior threads from the lock 810 list in case of lack of activity (as described for the CLH-TP algorithm immediately below), but applied to non-list locks, embodiments of the present invention differ in significant ways from the CLH-TP algorithm.

In the CLH-TP algorithm, if one thread stalls and the next thread detects it, the next thread will remove the previous thread's lock request from the queue. This is a slight simplification, but essentially there are only two parties involved in handling a thread preemption, the preempted thread and the successor. If more than one thread is preempted, the next thread simply slowly (manipulating the list of threads is costly) but surely advances in the queue.

In non-list lock algorithms there is only one lock 810 over which all threads 802, 804, 808 operate, therefore a thread detecting a preempted lock owner cannot physically remove the preempted thread from the lock.

The only thing the thread detecting a preempted lock owner can do is acquire the lock 810 itself and rely on the preempted thread to detect, once it resumes operation, that it had been preempted, that its ticket is no longer valid and then proceed to acquire the lock from scratch again. Failure of the thread detecting a preempted lock owner to do so would lead to two threads accessing the controlled resource 812 at the same time. Such an event, the avoidance of which is the whole reason for the existence of the lock, is known as a "collision".

This leads to a much more complex environment, where multiple threads in several kinds of states could all simultaneously be trying to modify the lock:

1. The lock owner 802 proceeding to release the lock;
2. the next lock owner 804, trying to mark the lock as in use;
3. a thread that has been preempted and now finds itself overtaken by other threads;
4. a stale next lock owner, that had been preempted before it could mark the lock as in use, and is now resuming operation and could potentially mark the lock in use in error (leading to a collision);
5. the next in line checking if the next lock owner has been preempted; and
6. a stale next in line, that had been preempted before it could jump the queue and mark the lock as its own and in use, and is now resuming operation and could potentially jump the queue and mark the lock in use in error (this too could lead to a collision).

Each of these multiple threads has to employ techniques to detect its own or other threads' rogue state and must be able to deal with this in order to avoid collisions and possible stalls. If two threads try to release the lock 810 at the same time, the lock 810 could get in such a state that a ticket is lost. If this happens and no thread is able to detect an LPR occurrence, no other thread will be able to acquire the lock 810.

In order to avoid this situation, in embodiments of the present invention the ticket structure is extended to have not only a next ticket machine and a current turn 920 display, but also a lock state 816 where lock claimers can sign the lock with their ticket and mark the lock as in use.

Whenever the lock is released (state number 1 above), the turn display 920 is incremented as usual, the lock state is set to 'unclaimed' and the identity of the last used ticket. This known state combination allows waiter threads to detect preemption and will be described below.

A high level implementation of an embodiment of a ticket based algorithm according to the present invention will now be described. The implementation uses 16 bit tickets and encodes the lock status (claimed/unclaimed) in one bit of the "taken" field. Pseudo code is shown below for the implementation, which will also be described with reference to FIGS. 10 and 11. The line numbers in the pseudo-code correspond with the reference numerals in FIGS. 10 and 11.

```
union display_t ::=
    struct detail
        {
        short turn;
        short taken;
        };
    int block;
LOAD_DISPLAY (source, dest) ::= dest.block = source.block
bb_lock_t ::=
    volatile short ticket;
    volatile display_t display;
        bb_lock(bb_lock_t lock) ::=
        begin 1
        display_t display
1002    initialize monitor time out
1004    get target ticket incrementing atomically lock.ticket
        repeat forever
        begin 2
1006        LOAD_DISPLAY(lock.display, display)
```

```
1008            calculate distance between display.detail.turn and
target ticket
1010/12         if distance less than zero, or distance greater than
old distance value, thread has been preempted
                        start again from <1002>
1014/16         else if distance is zero, thread is next lock owner
begin 3
1018                    set lock.display.detail.taken to the target ticket
plus the high bit set to signal that the lock has been claimed
1022                    load the current ticket from memory
                        if the current ticket matches the target ticket, then
there are no other lock requesters:
                                the lock has been safely acquired, exit
                        // execute this step in the case of memory model
being causal
1032                    LOAD_DISPLAY(lock.display, display)
                        // execute the next two steps if the memory model is
not causal
1034                    wait for lock.display.detail.taken to be written,
through a store-load barrier
1036                    read lock.display.detail.turn again
1038/40                 if display.detail.turn matches target, the lock has
been safely acquired
1042                            exit
                        else
                                the thread has been preempted, start again from
the <1002>
                        end 3// if distance is zero
1044/46         else if distance is one and timeout checking is turned
on
                begin 4
1048/50                 if display.detail.taken matches the next lock plus
the high bit set, next owner has claimed lock
1052                    turn off time out checking
1054                    else if display.detail.taken has unexpected value,
preempted thread has scribbled display
1056                    turn off time out checking
1058/62                 else if display.detail.taken matches (target ticket –
1) plus the high bit clear, the next lock owner still has not
claimed the lock
                        begin 5
1064                            decrement monitor timeout
1066                            if monitor timeout is zero
                                begin 6
1068                                    disable monitoring
1070                                    assemble new display.block value as 1) turn set
to target ticket and 2) taken set to target ticket plus the high
bit set
1072                                    atomically compare and swap new display.block
value with
lock.display.block
1076                                    if result of compare and swap matches old
display, lock taken
1078                                                            exit
                                end 6 // if monitor time out has expired
                        end 5 // display matches previous lock owner and lock
not taken
                end 4// if distance is one and time out checking is
turned on
        end 2 // repeat forever
        end 1// bb_lock
        bb_unlock(bb_lock_t lock) ::=
        begin
        display_t display
1102    LOAD_DISPLAY(lock.display, display)
1104    set display.detail.taken to display.detail.turn with the
high bit clear, to signal that the lock is not taken
1106    increment display.detail.turn
1108    LOAD_DISPLAY(display, lock.display)
1110 end
```

Figure 10A:
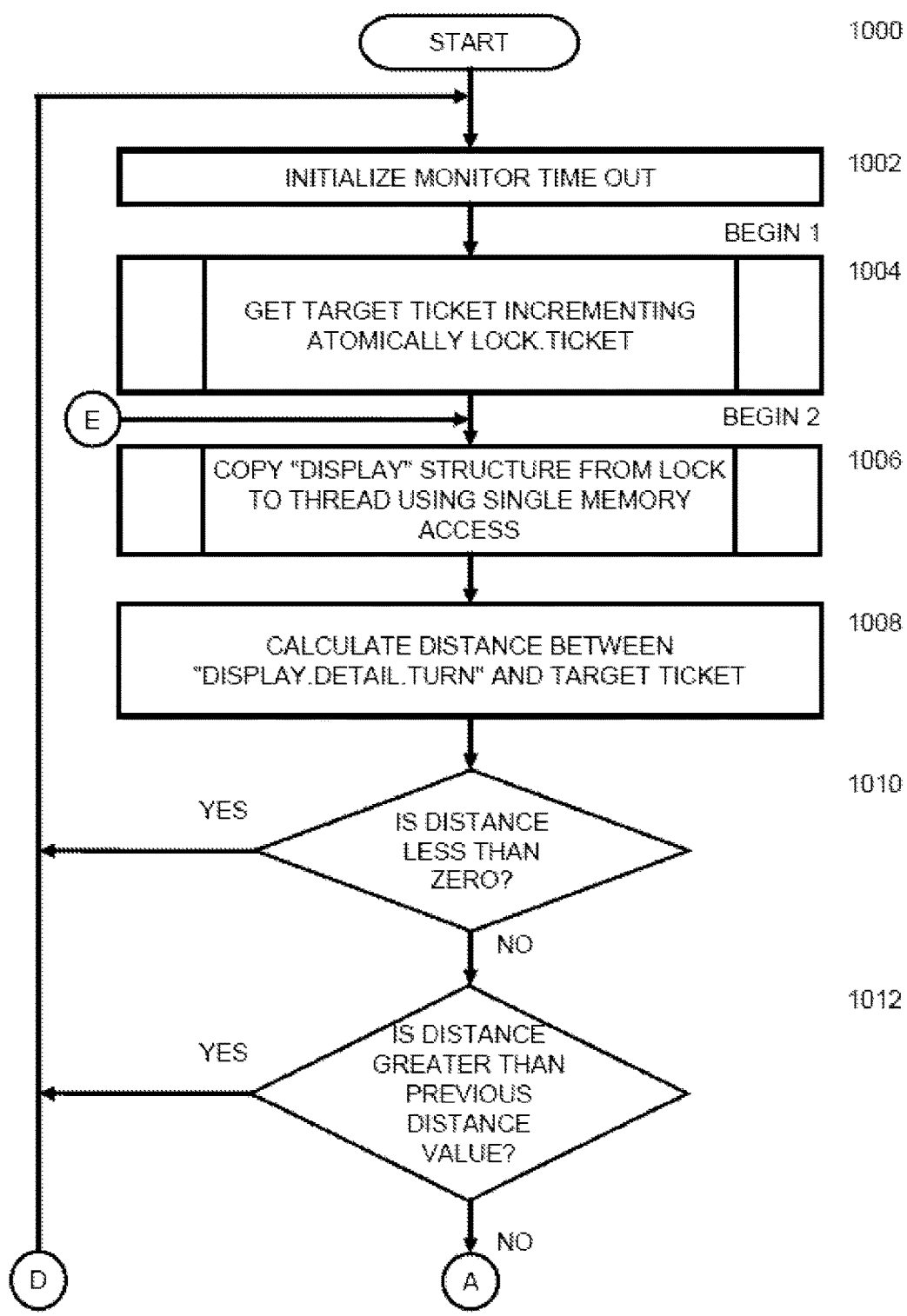
FIGS. 10A-10F show a flow chart of an embodiment of a method for acquiring a lock according to the present invention.

Referring to FIG. 10A, in an embodiment of the present invention, lock acquisition begins (state number 2 above) at step 1000. Steps 1002 to 1074 represent a loop that a thread 804 in state number 2 above performs whilst trying to acquire the lock 810, starting with obtaining a ticket for the lock 810 and ending with acquisition of the lock 810. At step 1002, a monitor time out is initialized. A monitor time out is the number of loops to wait before attempting to obtain the lock unfairly. At step 1004, a target ticket is obtained and lock.ticket 814 is incremented atomically.

Steps 1006 to 1074 represent a loop that the thread performs whilst trying to acquire the lock 810, starting with a previously acquired ticket for the lock 810 and ending with acquisition of the lock 810. At step 1006, the display structure 816 is copied from the lock 810 to the next lock owner 804 using a single memory access. As mentioned above, a single memory access is used and in the implementation described above a union between the detail structure 924 of detail.turn 920 and detail.taken 918 is used. The copied display structure is shown in FIG. 8 as display structure 806. The method now moves onto busy waiting for the turn display 920 to show the target ticket.

At step 1008, the current distance between the target ticket and the lock display, that is "display.detail.turn" is calculated. If the distance is less than zero, then this thread has been preempted and skipped by other threads, shown in FIG. 9 as subsequent lock owners 808. The thread will need either:
 (i) to restart from the beginning, that is processing returns to step 1002; or
 (ii) to abandon acquiring the lock altogether.

At step 1010, if the distance is zero or greater, then processing continues to step 1012. At step 1012, if the distance is greater than the previous value of the distance, then this thread has been preempted and skipped by other threads shown in FIG. 10 as subsequent lock owners 808. As described above, the thread will need either:
 (i) to restart from the beginning, that is processing returns to step 1002; or
 (ii) to abandon acquiring the lock altogether.

Figure 10B:
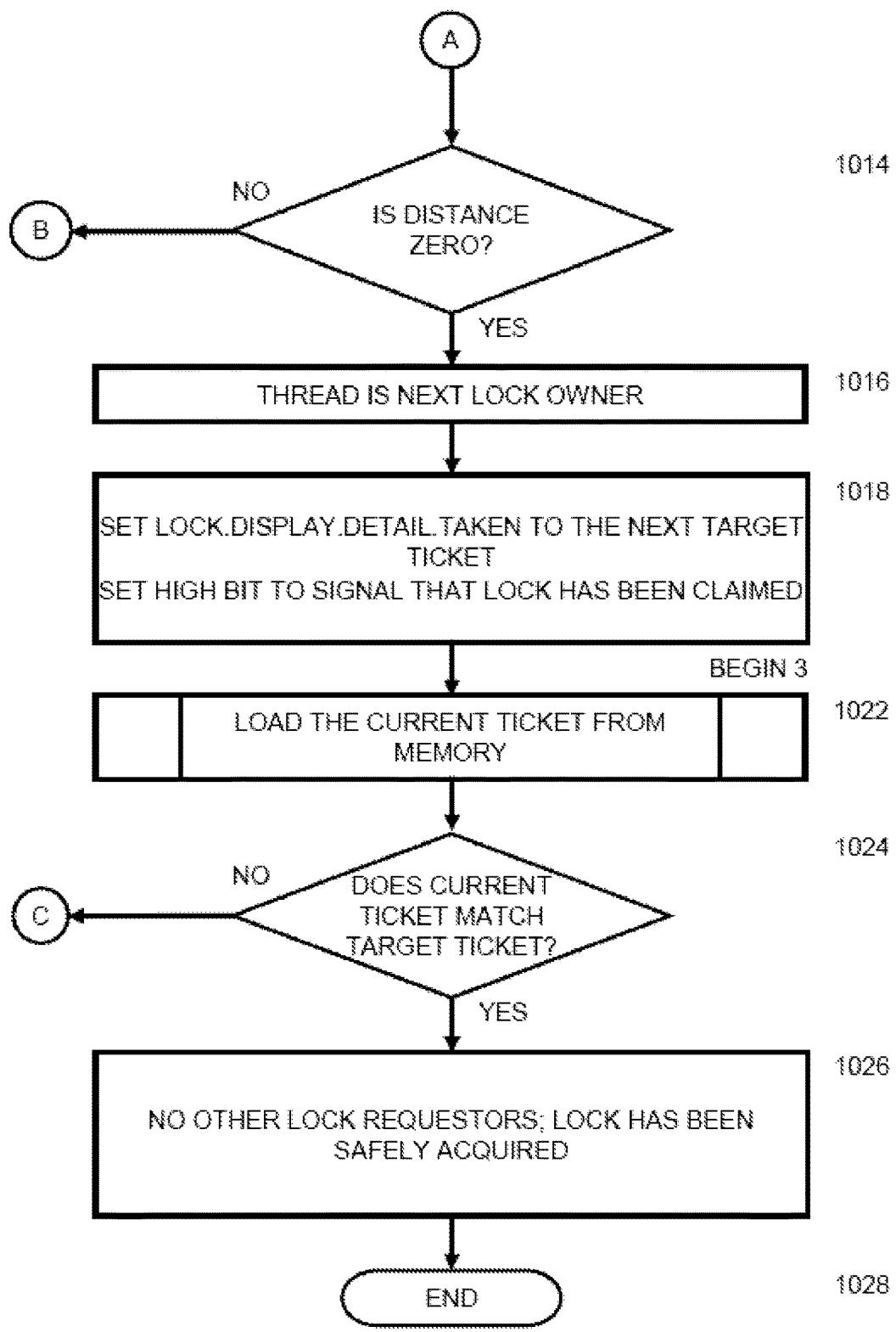

At step 1012, if the distance is less than or equal to the previous value, then processing continues through connector "A" to step 1014 in FIG. 10B. Referring to FIG. 10B, at step 1014, if the distance is not equal to zero, then processing continues through connector "B" to step 1044 in FIG. 10D. At step 1014, if the distance is equal to zero, then at step 1016, the thread is identified as the next lock owner.

At step 1018, the thread sets detail.taken 918 in the lock structure 816 to the target ticket to indicate, or publish, its identity as the thread that is claiming the lock. The thread also sets the high bit of detail.taken 918 in the lock structure 816 to indicate that the lock 810 is claimed. This could be achieved by the lock.display.detail.block in the lock 810 being atomically compared and swapped with display.detail.block in the thread. However, in performance terms, this is very expensive. Instead of using an atomic compare and swap at step 1018, non-atomic operations at steps 1018 to 1038 are used. Although the setting of detail.taken 918 to the target ticket and the setting of the high bit of detail.taken 918 are described as separate operations, they must be combined in one operation. Although the use of the high bit of detail.taken 918 has been described as the indicator that the lock 810 is claimed, any other indicator may be used, however, it is essential that detail.turn 920, detail.taken 918 and the indicator must be updated in a single memory access. If they were to be updated in separate memory accesses, then there is a window of opportunity in which the next thread 808 in the set sees the lock 810 as not claimed and thus starts a steal operation.

Allowing a preempted thread to scribble the lock state avoids costly atomic operations at each lock 810 acquisition. Preventing scribbling by using atomic compare and swap operations mean that the performance of the algorithm shows only a limited improvement over preemptable locks of perhaps about 15%. In an embodiment, a store-load barrier, that is, a barrier that makes sure that a write by a thread that has been preempted and finds itself overtaken by other threads, has been published to memory before the read by a stale next lock owner, that has been pre-empted before it could mark the lock as in use, and is now resuming operation and could potentially mark the lock in use in error occurs.

Store-Load barriers tend to be quite expensive in performance terms, second only to full barriers, that is, barriers that prevent any memory instruction reordering, or all the combinations of load-load, load-store, store-load and store-store together. However store-load barriers are not available in all platforms, a full barrier being the only available replacement. Where only a full barrier is available, it may be possible to simulate a store-load one through suitable load instruction ordering. In the x86 platform, for instance, the memory model is causal, meaning a load following a store to the same location has to wait for the store to complete, in order to be able to reread the value that had been previously stored. In such platforms, rereading the lock state and the turn display in a single load instruction, as described earlier, has to wait for the store instruction to complete before proceeding to the load, which has the effect of implementing the barrier at a fraction of the cost of a real memory barrier or an atomic instruction.

Since the algorithm has to wait for the CPU to complete the write before proceeding, while waiting for this write, that is, before executing the store-load barrier, several optimizations can be executed at essentially no cost. In an embodiment, the target ticket of the next owner thread can be compared with the current ticket. If the two match, then there is no thread monitoring for preemptions. The implication of this is that, with certain provisos, the next owner thread can exit safely without executing the store-load barrier. Executing this test essentially comes at no cost in the case where there are waiters because the current ticket load and the comparison will occur at the same time as the lock state is being scribbled. The total execution time of the barrier instruction alone or the load, test and barrier in sequence will take the same time.

The optimization described above can be safely applied in platforms where writes are globally visible across all cores at the same time, such as x86 or Sparc. By using a large enough monitoring delay, it is possible to guarantee that there will be no attempts at unfairly acquiring the lock until well after the lock state has been published to other cores of the CPU. This can be achieved by calculating the clock cycles taken by a waiting thread to go through one full wait loop (this will be platform specific). When this number, multiplied by the monitoring time out is much greater than the clock cycles taken by the barrier instruction, the next owner thread can be sure, if ever a next waiter tries to obtain the lock 810, the lock state will be published to this new thread well before it will try to unfairly acquire the lock 810.

Steps 1022 to 1038 represent the steps taken when the thread 804 checks to see that its claim to ownership of the lock 810 was successful. At step 1022, the current ticket is loaded from memory. At step 1024, a check is made as to whether the current ticket matches the target ticket. If the current ticket matches the target ticket, then at step 1026, it is ascertained that there are no other lock requester and that the lock has been safely acquired. Processing ends at step 1028. If the current ticket does not match the target ticket, then processing continues through connector "C" to step 1030 in FIG. 10C.

Figure 10C:
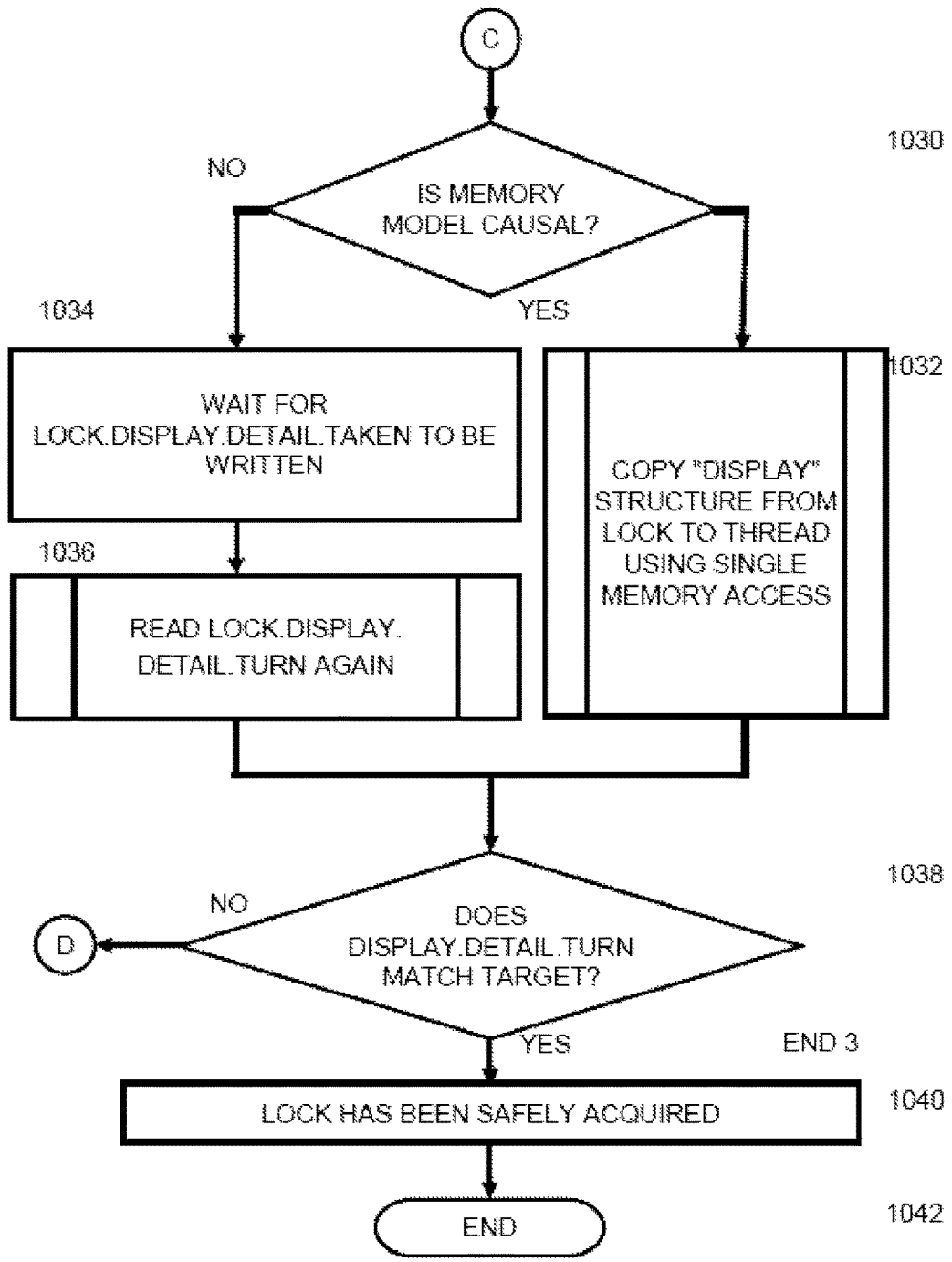

Referring to FIG. 10C, at step 1030, a check is made as to whether the memory model is causal. For example, the x86 series of processors uses a causal memory model and the POWER® series of processors use a non-causal memory model. A memory model is causal if memory operations that potentially are causally related are seen by every node of the system in the same order. When a node performs a read followed later by a write, even on a different variable, the first operation is to be causally ordered before the second, because the value stored by the write may have been dependent upon the result of the read. Similarly, a read operation is causally ordered after the earlier write on the same variable that stored the data retrieved by the read. A memory model is not causal if memory operations that potentially are causally related are not seen by every node of the system in the same order.

The memory model for the system will be known before execution of the method of the present invention, so step 1030 may typically be pre-determined at the time the method is compiled for execution by the processor. In an embodiment, step 1030 may consist of checking an indication as to whether it is executing on a processor using a causal memory model or not. In another embodiment, the compiled computer program may not contain an implementation of step 1030 and may contain an implementation of either step 1032 or of steps 1034 and 1036 depending on whether the memory model is causal or not.

If the memory mode is causal, then at step 1032, the display structure 816 is copied from the lock 810 to the thread 804 in a single memory access. This is achieved by a single operation read of lock.display.detail.block into display.detail.block. Processing continues to step 1038.

If the memory mode is not causal, then at step 1034, the thread has to wait, using a store-load barrier for lock.display.detail.taken 918 to be written. A store-load barrier ensures that all stores performed before the barrier are visible to other nodes, and that all loads performed after the barrier receive the latest value that is visible at the time of the barrier. In other words, it effectively prevents reordering of all stores before the barrier against all loads after the barrier. When lock.display.detail.taken 918 has been written through a store-load barrier, then, at step 1036, lock.display.detail.turn 920 is read again. Processing continues to step 1038.

At step 1038, a check is made as to whether the current ticket (display.detail.turn) 920 matches the target ticket. If the current ticket (display.detail.turn) 920 matches the target ticket, then at step 1040, the lock has been safely acquired and the thread 804 can proceed with manipulating the resource 812 controlled by the lock 810. Processing ends at step 1042. If the current ticket (display.detail.turn) 920 does not match the target ticket, then this thread has been preempted and skipped by other threads, shown in FIG. 8 as subsequent lock owners 808. The thread will need either:

(i) to restart from the beginning, that is processing returns through connector "D" to step 1002 in FIG. 10A; or (ii) to abandon acquiring the lock altogether.

Figure 10D:
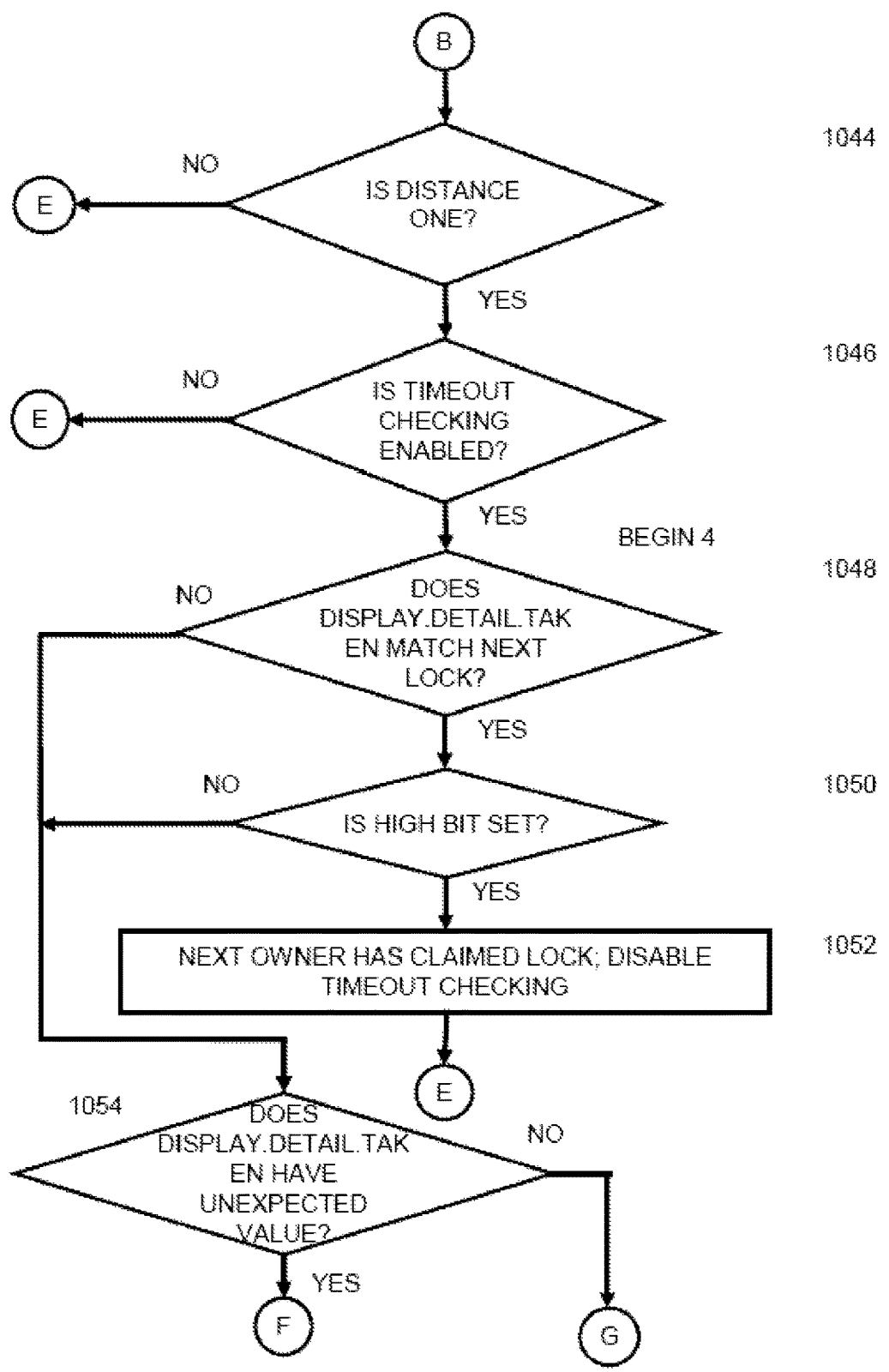
Figure 10E:
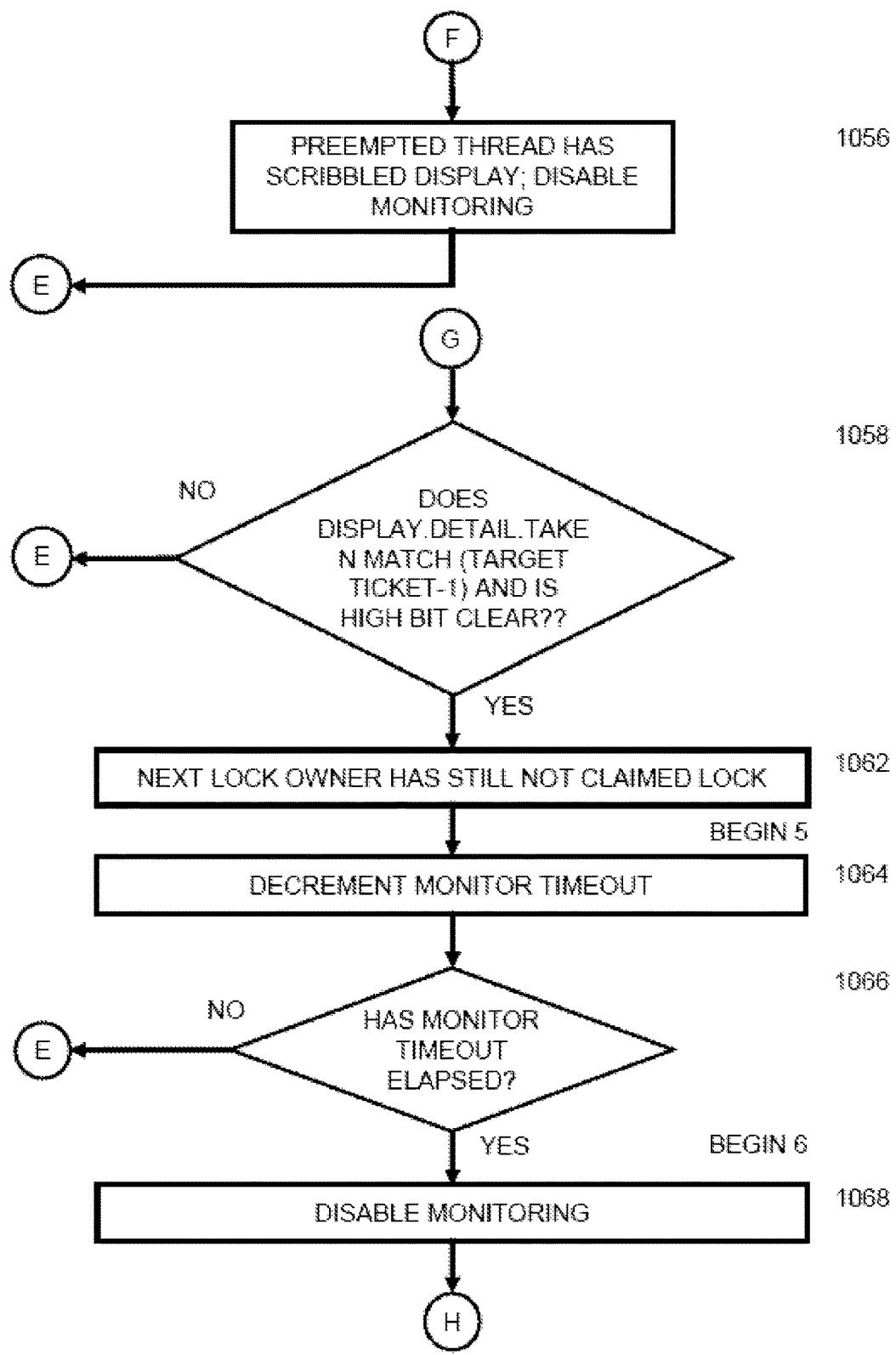

If at step 1014 in FIG. 10B, the distance was not equal to zero, then processing continued through connector "B" to step 1044 in FIG. 10D. Referring now to FIG. 10D, at step 1044, if the distance is not equal to one, then processing returns through connector "E" to step 1006 in FIG. 10A. If the distance is not equal to one, that means that the thread is still looping, waiting to acquire the lock, but that there are other threads ahead of this one. The thread now continues to monitor its position in the set of threads waiting to acquire the lock. If the distance is equal to one at step 1044, then, at step 1046, a check is made as to whether timeout checking is enabled. If timeout checking is not enabled, then processing returns through connector "E" to step 1006 in FIG. 10A. Again, that means that the thread is still looping, waiting to acquire the lock, but that there are other threads ahead of this one. The thread now continues to monitor its position in the set of threads waiting to acquire the lock. If timeout checking is enabled at step 1046, then processing proceeds to step 1048.

At step 1044, the check could be made for distances between one and a number higher than one, such as two, three, four or more. This would allow more than one thread to monitor that status of the lock.display structure 816. This has the disadvantage of allowing more threads to concurrently jump at the opportunity of acquiring the lock unfairly, thereby triggering a thundering herd. Such a disadvantage could be avoided by having each waiting thread use a monitoring timeout proportional to its position in the set of threads. However, this means that multiple threads have to re-acquire the lock 810 from the beginning which could affect lock 810 throughput. In practice, limiting the distance to one, that is the number of monitoring threads to one, does not have any negative impact on the prevention of LRP and avoids a thundering herd.

Steps 1048 to 1074 represent steps carried out by the thread following thread 804 monitoring to see that thread 804 actually claims the lock 810, and unfairly claiming the lock 810 if thread 804 does not claim the lock 810. At step 1048, a check is made as to whether display.detail.taken 918 matches the next lock requester, so as to determine if the next owner of the lock has been preempted. If display.detail.taken 918 matches the next lock requester, read as display.detail.taken 918 in a single instruction at step 1006, then processing proceeds to step 1050. If display.detail.taken 918 does not match the next lock requester, then display.detail.taken 918 has been scribbled by a rogue, preempted thread and no decision can be made based on the value of display.detail.taken 918 as it contains a random value. Processing proceeds to step 1054 as this thread has not succeeded in writing display.detail 918 with its ticket.

At step 1050, a check is made as to whether the high bit of display.detail.taken 918 is set. If the high bit of display.detail.taken 918 is set, then thread 804 has succeeded in claiming the lock and processing passes to step 1052. Processing reaches step 1052 if display.detail.taken 918 matches the next lock requester (checked at step 1048), that is thread 804, and the high bit of display.detail.taken 918 is set (checked at step 1050), meaning that this thread has successfully claimed the lock. At step 1052, timeout checking is disabled. If the next owner has successfully claimed the lock, then the next owner continues looping, waiting to complete acquisition of the lock when the present owning thread 802 releases the lock. Monitoring of the lock 810 can stop.

If the high bit of display.detail.taken 918 is not set, then the next lock owner 804 has not yet claimed the lock 810 and processing passes to step 1054. Processing reaches step 1054 if display.detail.taken 918 does not match the next lock requester (checked at step 1048) or if the high bit of display.detail.taken 918 is not set (checked at step 1050), meaning that the next owner has not succeeded in claiming the lock. At step 1054, a check is made as to whether display.detail.taken 918 has an unexpected value. If display.detail.taken 918 has an unexpected value, then processing proceeds through connector "F" to step 1056 in FIG. 10E. If display.detail.taken 918 does not have an unexpected value, then processing proceeds through connector "G" to step 1058 in FIG. 10E.

Processing reaches step 1056 if display.detail.taken 918 has an unexpected value. This is because a pre-empted thread has scribbled, or overwritten display.taken 918 with thread information that is no longer current and therefore incorrect. There could be more than one preempted thread scribbling the lock 810. At step 1056, timeout checking is disabled. Again, that means that the thread is still looping, waiting to acquire the lock 810, but that there are other threads ahead of this one. The thread now continues to monitor its position in the set of threads waiting to acquire the lock.

There is a corner case whereby a thread could have been preempted for exactly the same number of lock requests that the turn display counter can cater for, for example on a 16 bit integers, 65536. This can be avoided by having the turn display/state union also include a unfair claims counter, incremented at each occurrence of an unfair claim, which the read can also check to determine if the thread has been preempted or not.

At step 1058, a check is made as to whether display.detail.taken 918 matches (target ticket −1) and whether the high bit is clear. If display.detail.taken 918 matches (target ticket −1) and the high bit is clear, then that means that the thread immediately ahead of this thread in the set should be claiming the lock 810, but has not yet done so. The thread immediately ahead of this thread has a ticket number of (target ticket −1) and not yet claimed the lock by setting the high bit.

If display.detail.taken 918 does not match (target ticket −1) or if the high bit is not clear, then the thread now continues to monitor its position in the set of threads waiting to acquire the lock 810. Processing returns through connector "E" to step 1006 in FIG. 10A.

Processing reaches step 1062 if display.detail.taken 918 matches (target ticket −1) and the high bit of display.detail.taken 918 is clear, meaning that the next owner has still not claimed the lock.

Steps 1064 to 1074 represent steps the thread 804 carries out when the distance matches that of the previous lock owner and the lock 810 is not taken. At step 1064, the monitor timeout is decremented. At step 1066, a check is made as to whether the monitor timeout has elapsed. If the monitor timeout has elapsed, then processing passes to step 1068. If the monitor timeout has not elapsed, then that means that the next lock owner 804 still has time to claim the lock 810. The thread now continues to monitor its position in the set of threads waiting to acquire the lock 810. Processing returns through connector "E" to step 1006 in FIG. 10A. Processing reaches step 1068 if the monitor timeout has elapsed. At step 1068, monitoring is disabled. Processing continues through connector "H" to step 1070 in FIG. 10F.

Figure 10F:
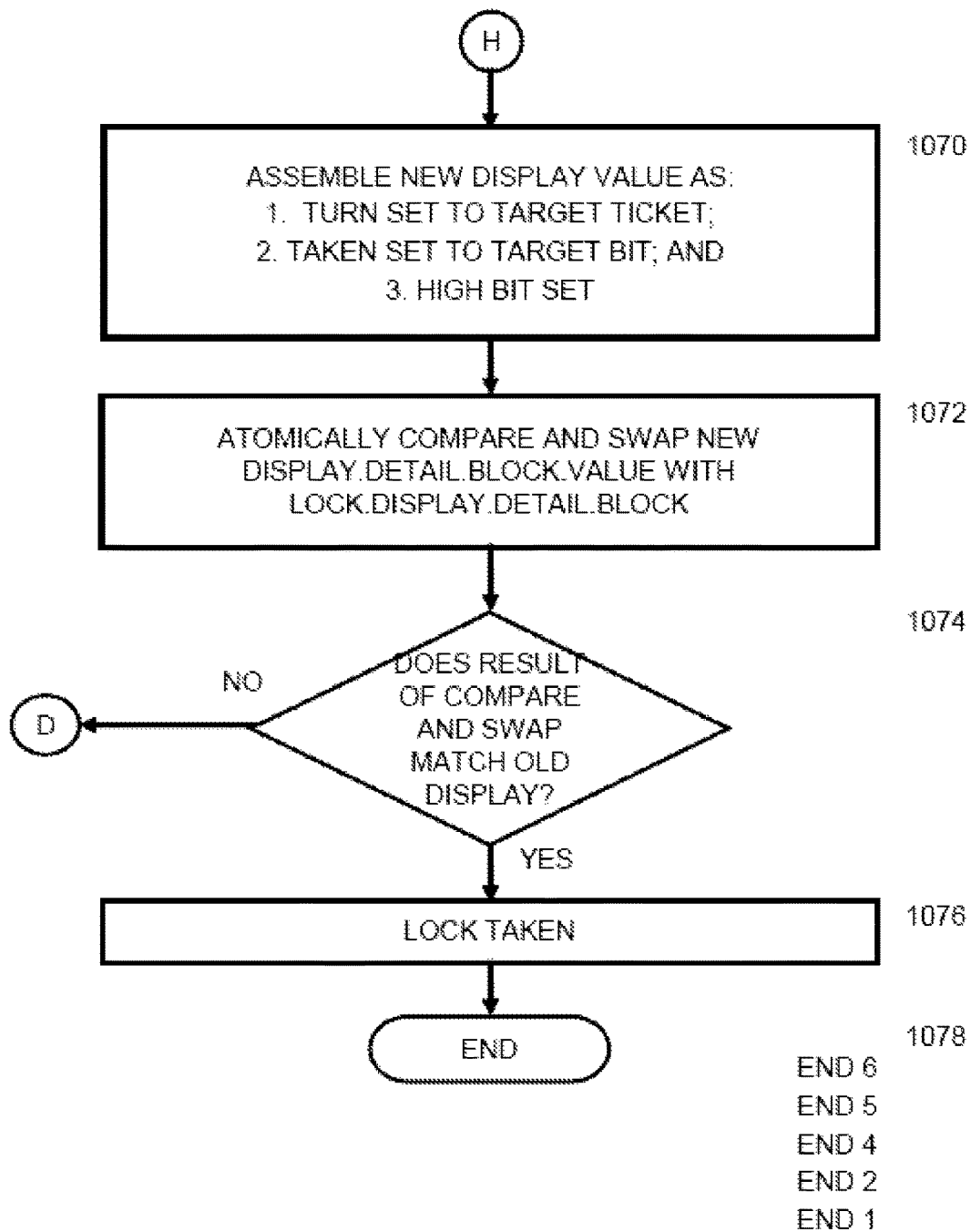

Referring to FIG. 10F, the thread will try to set the lock state as "claimed", the claimant id as its own target ticket and detail.turn 920 to its own target ticket. If this operation succeeds, then the thread 804 has unfairly acquired the lock 804 and skipped a pre-empted thread. This may happen when a stale next thread, which had been preempted before it could jump the queue and mark the lock 810 as its own and in use, is now resuming operation and could potentially jump the queue and mark the lock 810 in use in error, which could lead to a collision.

A new display.block 922 is assembled with detail.turn set to the target ticket, detail.taken 918 set to the target ticket and the high bit of detail.taken set. The new display.block 922 represent the stealer's turn, signature and taken flag in a local display variable. At step 1072, the new display.detail.block.value is atomically compared and swapped with lock.display.detail.block.

The atomic compare and swap instruction takes the three arguments of (i) the memory location it is intended to write to; (ii) the value it is intended to write; and (iii) the value that it is expected to find in the memory location. The atomic compare and swap instruction then proceeds to (i) lock the bus, thereby preventing any memory manipulation from other CPUs; (ii) read the value from the memory location identified in the first argument; and (iii) compare it with the value in the third argument. If the value read from the memory location identified in the first argument matches the value in the third argument, then the value in the second argument is written to the memory location identified in the first argument. If the value read from the memory location identified in the first argument does not match the value in the third argument, then the value in the memory location identified in the first argument is left unchanged. Finally, the bus is released. The result returned by the instruction is the old value read from the memory location identified in the first argument. The significance in embodiments of the present invention of the value in the second argument being written to the memory location identified in the first argument only if the value read from the memory location identified in the first argument matches the value in the third argument, is that a write to lock.display 816 only occurs when the state of the lock 814 is unclaimed.

In step 1072, the atomic compare and swap instruction on lock.display.block, that is the display.block.value assembled in step 1070 together with the display.block read at 1006 means that in a single operation the thread tampers with the display structure 816. The use of a costly atomic compare and swap instruction here has no impact on the performance of the algorithm because it is only performed during unfair locking acquisition, that is, a limited number of times by threads other than the next lock owner. At step 1074, a check is made to see if the result of the compare and swap matches the old display. If the result does not match, then the thread will need either:

(i) to restart from the beginning, that is processing returns through connector "D" to step 1002 in FIG. 10A;
(ii) to abandon acquiring the lock altogether; or
(iii) continues to monitor its position in the set of threads waiting to acquire the lock 810, that is processing returns through connector "E" to step 1006 in FIG. 10A. As the distance is either negative or higher than the previous distance, then at step 1010 or step 1012, processing will then return to step 1002 in FIG. 10A.

If the result matches, then the expected lock 810 owner 804 hasn't tried to claim the lock 810 between step 1006 and step 1072 and the thread can be certain that the lock 810 has been successfully claimed by itself. At step 1076, the lock 810 is taken by the thread which can proceed with manipulating the resource 812 controlled by the lock 810. Processing ends at step 1078.

Figure 11:
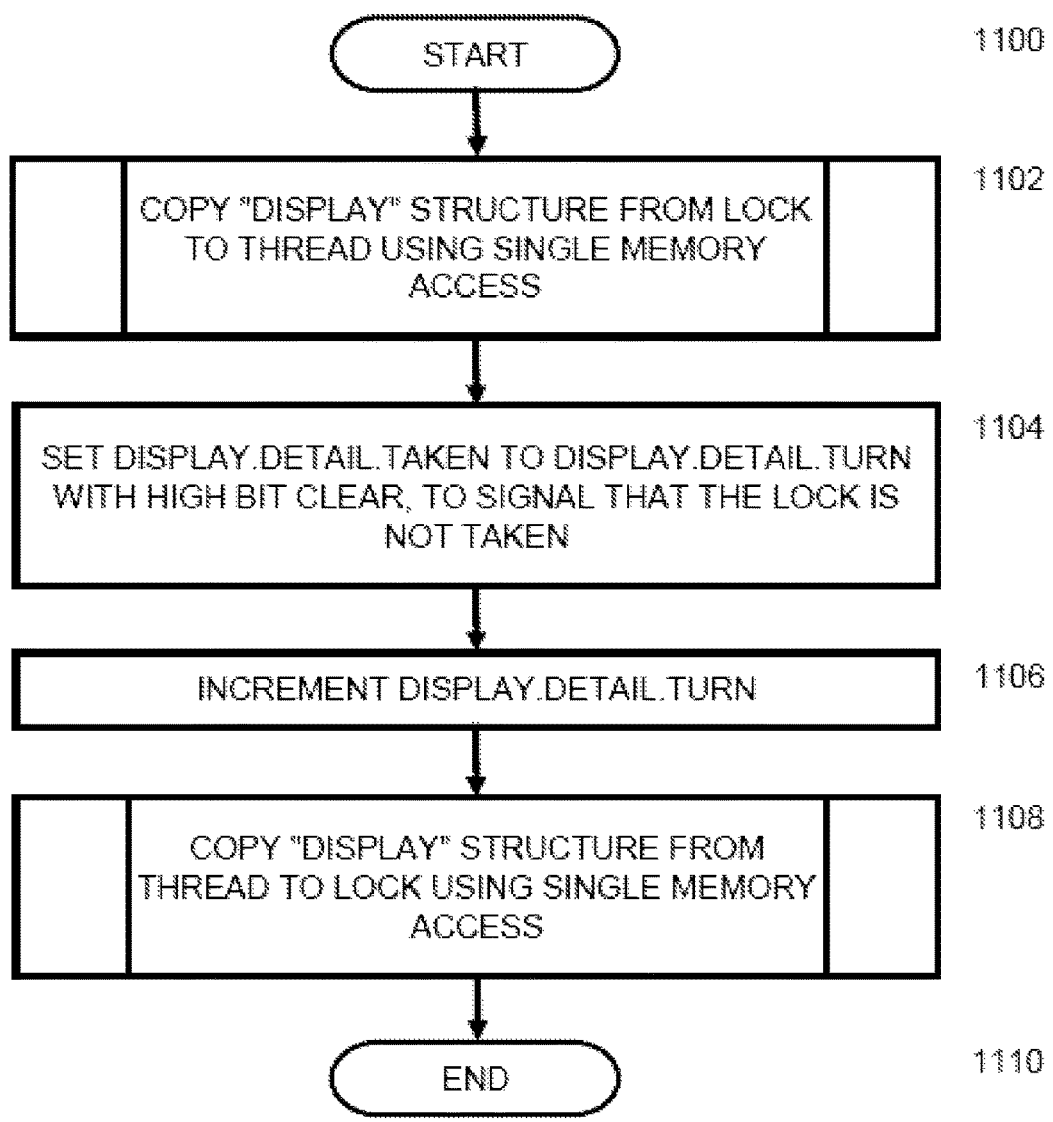
FIG. 11 shows a flow chart of an embodiment of a method for releasing the lock acquired in the embodiment of FIG. 10.

FIG. 11 shows a flow chart of an embodiment of a method for releasing the lock acquired in the embodiment of FIG. 10. The method sets the current value of the taken indicator to the current value of the turn indicator and increments the turn indicator. The method starts at step 1100. At step 1102, the display structure 816 is copied from the lock 810 to the thread 804 in a single memory access. This is achieved by lock.display.detail.block being loaded in a single operation into display.detail.block. At step 1104, the thread sets detail.taken 918 in the lock structure 816 to display.detail.turn to indicate that the lock is available to the next lock requester. The thread also clears the high bit of detail.taken 918 in the lock structure 816 to indicate that the lock 810 is not taken. At step 1106, display.detail.turn is incremented. At step 1108, the display structure 816 is copied from the thread 804 to the lock 810 in a single memory access. This is achieved by a union write. Processing ends at step 1110.

The embodiment of FIG. 10 corresponds to a non cancelable busy lock, that means that the thread enters the routine of FIG. 10 and does not exit until the lock 810 has been acquired. In another embodiment, the lock requester exits without acquiring the lock 810 if it finds it has been preempted. In this embodiment, at steps 1010, 1012, 1038 and 1074, instead of returning to step 1002 and getting a target ticket, an error is returned and the processing ends.

A further advantage of embodiments of the present invention is that, unlike the MCS or CLH algorithms, being an addition to non list fair algorithms, embodiments of the present invention can be used in conjunction with the embodiments of co-pending GB patent application GB1406833.2, "A busy lock and a passive lock featuring embedded load management capabilities" with no modifications to either, in environments where both convoys and starvation can be a problem, such as database engines in hosted environments. In other embodiments each of embodiments of the present invention and embodiments of the co-pending patent application may be used independently where only one of the two side effects is likely to be a problem. Further, embodiments of the present invention can be used in other non list fair locks, such as in an LRP resilient implementation of the two thread lock Peterson algorithm.

Figure 12:
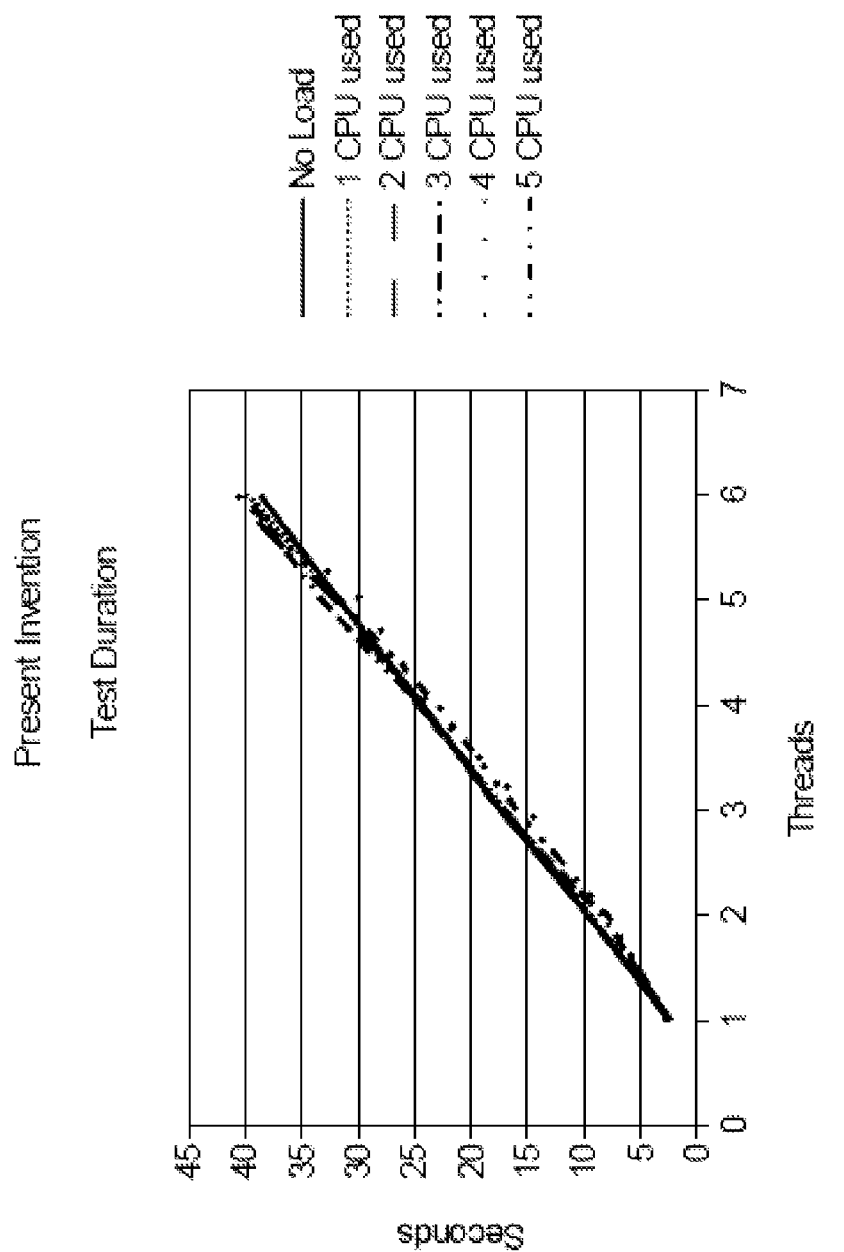
FIG. 12 shows graphs of test case run time versus the number of threads in a second test case scenario for an embodiment of an algorithm according to the present invention, as load, in the form of single CPU virtual machines with 50% CPU load, is added.

FIG. 12 shows a graph of test case run time versus the number of threads in the second test case scenario for an embodiment of an algorithm according to the present invention, as load, in the form of single CPU virtual machines with 50% CPU load, is added. As the number of threads increases, the execution time increases by around seven seconds per thread. The execution time is substantially unchanged from no load as CPU virtual machines are added.

FIG. 13 shows the execution times for each of the "Tickets", "Test, Set and Test, Backoff", "Preemptable Locks" algorithms together with an embodiment of an algorithm according to the present invention when run with as many lock requesters as there are CPUs available (in this case, six threads, six CPUs), with a varying amount of external load, in the form of virtual machines taking 50% of physical CPUs time (from 0 to 5). Under no load conditions, embodiments of the present invention are about 8% slower than the "Tickets" algorithm, which is the best performer under no load. As extra CPU virtual machines are added, the execution time remains substantially unchanged, much like the "Preemptable Locks" algorithm. The execution time of the "Test, Set and Test, Backoff" algorithm decreases as extra CPU virtual machines are added. However, it is only when all except one CPU are busy with extra load that embodiments of the present invention perform worse than the "Test, Set and Test, Backoff" algorithm and then only around 10% worse.

Embodiments of the present invention also provide execution times matching the "Test, Set and Test, Backoff" and "Tickets" algorithms in the non contended case, thereby providing a clear performance advantage over list locks. The overall improvement in execution time makes dealing with the complexity of handling collisions a worthwhile exercise. This also has the advantage of improving performance in the situation where there are no other lock requesters.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
publishing a current state of a lock and a claim non-atomically to the lock by a next owning thread, in an ordered set of threads, that has requested to own the lock, the claim comprising a structure capable of being read and written only in a single memory access,
obtaining, by each thread in the ordered set of threads, a ticket,
wherein the claim comprises an identifier of a ticket obtained by the next owning thread, and an indication that the next owning thread is claiming the lock;
comparing the ticket obtained by the next owning thread with a current ticket;
responsive to a match between the ticket obtained by the next owning thread and the current ticket, preventing thread monitoring preemptions; and
responsive to a match between the ticket obtained by the next owning thread and the current ticket, non-atomically acquiring the lock.

2. The method of claim 1, further comprising waiting, by the next owning thread, for the lock to be released.

3. The method of claim 2, wherein the comparing is performed during the waiting.

4. The method of claim 2, wherein the waiting occurs at the same time as a scribbling of the lock.

5. The method of claim 2 further comprising:
in response to the waiting, entering, by the next owning thread, a tight loop during the waiting; and
in response to the entering, inspecting, by the thread, the lock until the lock is free.

6. The method of claim 2, in response to the waiting, queuing, by the next owning thread, the next owning thread in a linked list of waiting threads.

7. The method of claim 6, in response to the queuing, waiting, by the next owning thread, for the next owning thread to be woken up by a lock owner once the lock is available,
wherein the waiting comprises, suspending, by the next owning thread, execution of the next owning thread.

8. The method of claim 1, wherein the structure is a union.

9. The method of claim 1, wherein each thread in an ordered set of threads has requested to own the lock.

10. A system comprising:
a lock for controlling access to a shareable resource, the lock maintaining an ordered set of threads requesting ownership of the lock,
a claim, capable of being read and written only in a single memory access, non-atomically published by a next owning thread, in the ordered set of threads, making a claim to the lock,
obtaining, by each thread in the ordered set of threads, a ticket,
wherein the claim comprises an identifier of a ticket obtained by the next owning thread, and an indication that the next owning thread is claiming the lock; and
one or more processors, one or more computer-readable memories, one or more computer-readable tangible storage devices, and program instructions stored on at least one of the one or more computer-readable tangible storage devices for execution by at least one of the one or more processors via at least one of the one or more memories, wherein the system is capable of performing a method comprising,
after publishing a current state of the lock and the claim, comparing the ticket obtained by the next owning thread with a current ticket,
responsive to a match between the ticket obtained by the next owning thread and the current ticket, preventing thread monitoring preemptions, and
responsive to a match between the ticket obtained by the next owning thread and the current ticket, non-atomically acquiring the lock.

11. The system as claimed in claim 10, further comprising waiting, by the next owning thread, for the lock to be released.

12. The system as claimed in claim 11, wherein the comparing is performed during the waiting.

13. The system as claimed in claim 11, wherein the waiting occurs at the same time as a scribbling of the lock.

14. A computer program product, the computer program product comprising a computer-readable storage medium having program instructions embodied therewith, the program instructions executable by a processor to cause the processor to perform a method comprising:

publishing a current state of a lock and a claim non-atomically to the lock by a next owing thread, in an ordered set of threads, that has requested to own the lock, the claim comprising a structure capable of being read and written only in a single memory access, wherein the claim comprises an identifier of a ticket obtained by the next owning thread, and an indication that the next owning thread is claiming the lock;

comparing the ticket obtained by the next owning thread with a current ticket;

responsive to a match between the ticket obtained by the next owning thread and the current ticket, preventing thread monitoring preemptions; and responsive to a match between the ticket obtained by the next owning thread and the current ticket, non-atomically acquiring the lock.

15. The computer program product of claim 14, further comprising waiting, by the next owning thread, for the lock to be released.

16. The computer program product of claim 15, wherein the comparing is performed during the waiting.

17. The computer program product of claim 15, wherein the waiting occurs at the same time as a scribbling of the lock.

* * * * *